(12) United States Patent
Zhu et al.

(10) Patent No.: US 10,818,952 B2
(45) Date of Patent: Oct. 27, 2020

(54) LIGNIN-BASED ELECTROLYTES AND FLOW BATTERY CELLS AND SYSTEMS

(71) Applicant: Northeastern University, Boston, MA (US)

(72) Inventors: Hongli Zhu, Arlington, MA (US); Jonathan Hamel, Cambridge, MA (US)

(73) Assignee: Northeastern University, Boston, MA (US)

( * ) Notice: Subject to any disclaimer, the term of this patent is extended or adjusted under 35 U.S.C. 154(b) by 39 days.

(21) Appl. No.: 16/204,314

(22) Filed: Nov. 29, 2018

(65) Prior Publication Data

US 2019/0165402 A1 May 30, 2019

Related U.S. Application Data

(60) Provisional application No. 62/593,034, filed on Nov. 30, 2017.

(51) Int. Cl.
*H01M 8/18* (2006.01)
*D21C 11/00* (2006.01)
*H01M 8/08* (2016.01)
*H01M 8/0289* (2016.01)

(52) U.S. Cl.
CPC ......... *H01M 8/188* (2013.01); *D21C 11/0007* (2013.01); *H01M 8/0289* (2013.01); *H01M 8/08* (2013.01); *H01M 2300/0002* (2013.01)

(58) Field of Classification Search
CPC ................. H01M 2300/0002; H01M 2/1653
See application file for complete search history.

(56) References Cited

U.S. PATENT DOCUMENTS

| | | | |
|---|---|---|---|
| 4,270,991 A * | 6/1981 | Woods | C25D 11/06 205/108 |
| 2010/0003586 A1* | 1/2010 | Sahu | H01M 8/1016 429/101 |
| 2012/0136097 A1* | 5/2012 | Berlin | C08H 6/00 524/73 |
| 2013/0040031 A1* | 2/2013 | Stecker | C25B 3/02 426/538 |

OTHER PUBLICATIONS

Kajita et al. (Plant Physiol. (1997) 114: 871-879).*
Casado et al. (ChemSusChem 2017, 10, 1783—1791, published Feb. 15, 2017 p. 1791)).*
Hamel, Jonathan A. Thesis: "Low-cost and metal-free aqueous flow battery with ultrafiltered lignin electrolyte," Northeastern University, The Department of Mechanical and Industrial Engineering (Dec. 2017).

* cited by examiner

*Primary Examiner* — Olatunji A Godo
(74) *Attorney, Agent, or Firm* — Hamilton, Brook, Smith & Reynolds, P.C.

(57) ABSTRACT

Lignin-based electrolytes and flow battery cells and systems for use with lignin-based electrolytes are disclosed.

18 Claims, 25 Drawing Sheets

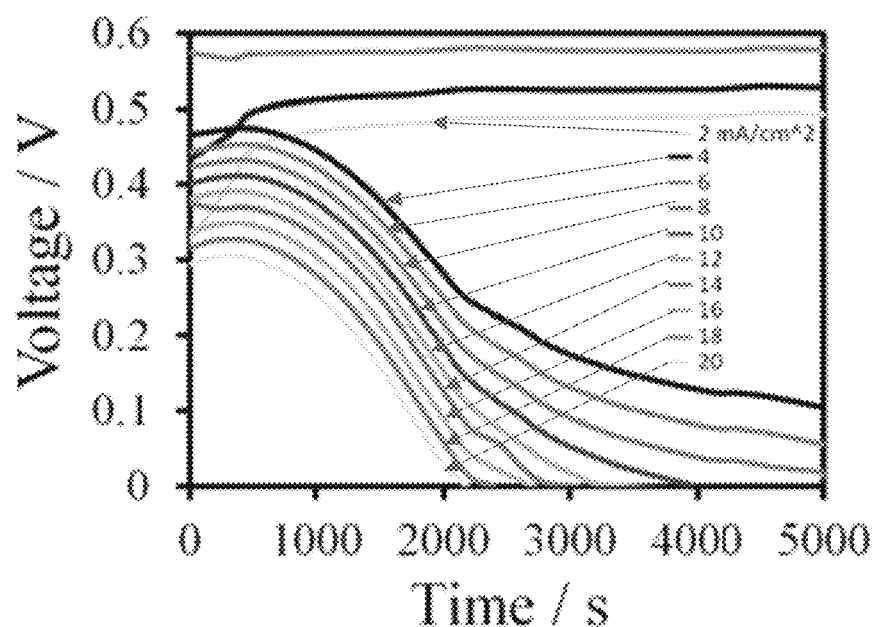
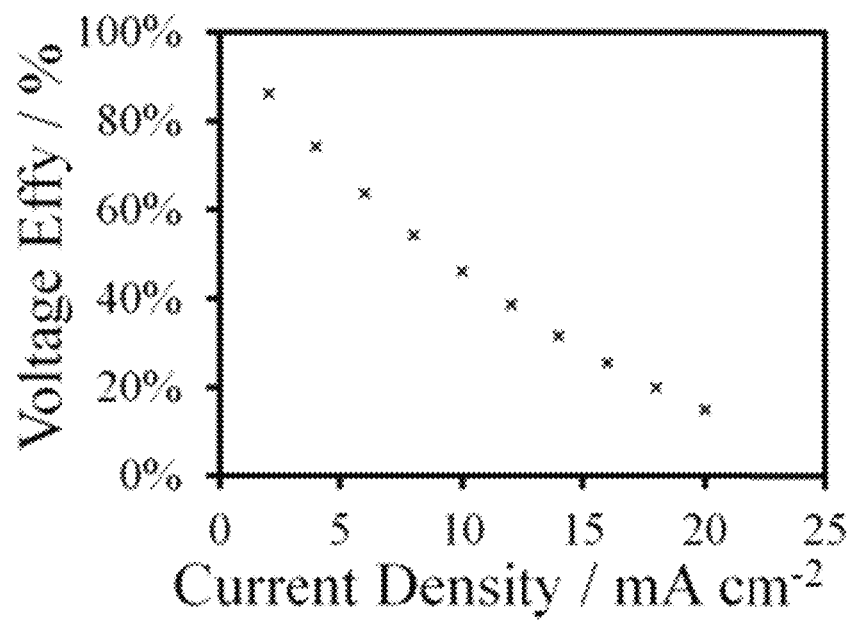
FIG. 24 A-B

LIGNIN-BASED ELECTROLYTES AND FLOW BATTERY CELLS AND SYSTEMS

This application claims the benefit of U.S. Provisional Application No. 62/593,034, filed on Nov. 30, 2017. The entire teachings of the above application are incorporated herein by reference.

BACKGROUND

As the number of generation sources from intermittent renewable technologies on the electric grid increases, the need for large scale energy storage devices is becoming essential to ensure grid stability. The need to reduce dependence on carbon emitting forms of electricity generation has led to a recent increase in the integration of environmentally friendly energy sources.[1,2] Two of the most rapidly growing forms of renewable energy, solar and wind, present demand response issues for electrical infrastructure due to their intermittent nature.[3] During high demand periods, these intermittent sources require supplemental power output in the form of either peaking power plants or electricity energy storage.

Solid electrode batteries have been deployed for short duration load deferment; however, since power and energy cannot be scaled independently from one another in these batteries, they cannot be cost effectively designed to sustain peak power output for long enough durations to effectively defer wind and solar.[4]

Redox flow batteries do not suffer from this limitation, and therefore provide a viable path for long duration grid scale load deferment.[1,5] Flow batteries offer an advantage over conventional sealed batteries, as their energy and power can be scaled independently from one another. This allows flow batteries with properly developed electrolytes to increase their storage durations without needing to increase the capacity of expensive power equipment necessary to scale-up conventional batteries. However, redox flow battery development has historically been burdened by the high costs of their materials of construction, high cost of electrolytes, and precious metal catalysts required to drive the desired redox reaction.[4]

Flow battery electrolytes are needed to meet the market demands of low cost, sustainability, nontoxicity, and eco-friendliness, which are required to enable energy storage at large scales.

SUMMARY

Novel flow battery electrolytes are described herein which have a number of advantages including low cost, sustainability, nontoxicity, and/or eco-friendliness. These advantages are important to enable energy storage at large scales, for example, for residential solar energy storage. These flow battery electrolytes present a unique opportunity for a low cost, metal-free, flow battery system capable of multiple charge-discharge cycles for safe, large scale energy storage.

Embodiments of the electrolyte use lignin or ligninsulfonate (also referred to herein as "lignin-based electrolytes"). Lignin and ligninsulfonate can be extracted from the waste of biofuel and paper manufacturing as the primary active material of the electrolytes.

One embodiment is an electrolyte for a flow battery, comprising lignin or ligninsulfonate, dissolved in a liquid.

A further embodiment is a flow battery system comprising an electrolyte for a flow battery, comprising lignin or ligninsulfonate, dissolved in a liquid.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 24A provides a graph of cell voltage vs time at various current densities.

FIG. 24B provides a graph of calculated voltage efficiencies at various current densities.

DETAILED DESCRIPTION

A description of example embodiments follows.

Ligninsulfonate has been investigated as a low cost, earth abundant material that is redox active due to its naturally forming phenol groups.[6,5] Ligninsulfonate is a very common biopolymer, comprising approximately 20 to 30% of the biomass of most types of wood.[7-9] Lignins are produced as a byproduct of the pulping process during paper manufacturing, and due to limited industry demand for lignin derivatives they are often burned at a low heating value to recover their waste energy for the paper manufacturing process.[9,10] Because of the abundance of this lignin byproduct, an estimated 9.8×10$^5$ tons per year,[11] and its limited use, lignin is a low cost and sustainable material.

The redox functions of lignin are used in energy conversion processes in plants.[7] Because of this known redox activity, lignin has seen some precedence being studied as a redox active species for manmade materials. Lignin has been used as a doping agent with polypyrroles to make electrodes.[6] However, lignin and ligninsulfonate have not been used as the basis of electrolytes for flow batteries.

Lignin and ligninsulfonate have many advantages. Unlike many existing flow battery technologies,[12-14] lignin is sustainable, renewable, and earth abundant as it is a naturally occurring biopolymer. It is non-toxic to animals, contains no or substantially no heavy metals, and is environmentally friendly. Some lignins have even been approved for use as a dust control dispersant on dirt roads, which speaks to the lack of adverse effects that lignins have on the environment. Flow batteries based on lignins have an advantage over other redox chemistries, as they can be deployed at energy capacities large enough for grid-scale load deferment without posing any significant health or environmental hazards to their surroundings.

Figure 1:
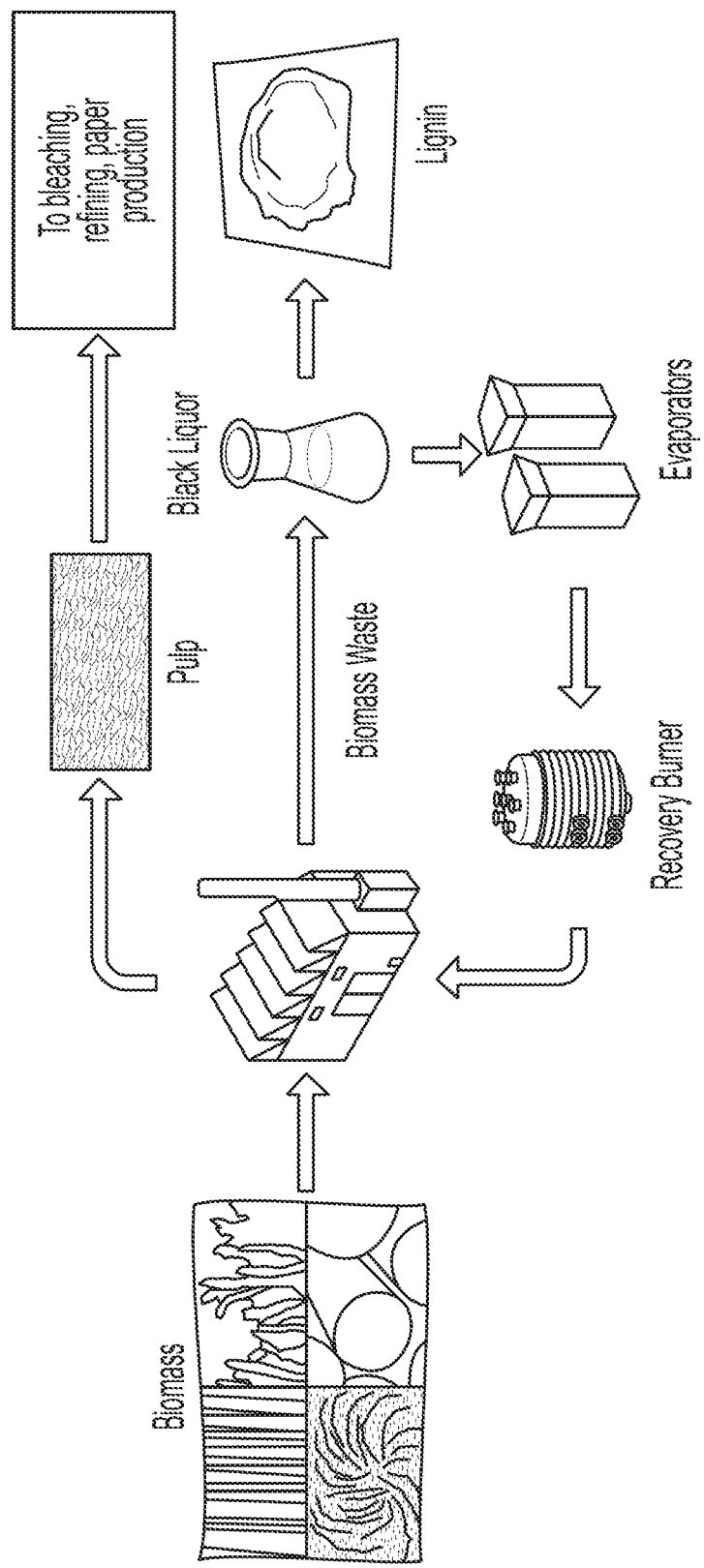
FIG. 1 provides a flow diagram of a typical lignin extraction process. Lignin powder is derived from black liquor, a waste product of pulping processes used in the manufacture of paper.

During pulping processes for paper manufacturing, the useful pulp is extracted and separated from the rest of the material in the feedstock, leaving behind a waste product known as black liquor. This black liquor contains high concentrations of lignin, up to approximately 43 wt %[15] depending on the feedstock and pulp extraction method used. FIG. 1 shows a simplified schematic of lignin extraction from a typical pulping process. After the pulp is removed, the lignin-rich black liquor waste product is most often dried and sent back to the plant to recover the energy from this material in the form of heat. The black liquor does not have a high heating value compared to more common forms of carbon based heating fuel, and therefore is not generally regarded as a useful fuel. Rather than being burned, the lignin material can easily be separated from the other black liquor constituents using ultrafiltration methods.[16] When these methods are used on the black liquor byproduct of the sulfite wood pulping process, sulfonated lignins are produced and can be dried to yield a fine brown powder, which is shown below on the right side of FIG. 1. These sulfonated lignins, also called ligninsulfonate, are highly water soluble and can also be dissolved in many acids.

Because the extraction process of useful lignins from black liquor is simple, and since both are waste products of a high volume process, they are produced at very low cost. In 2013 Arkell et al. determined that ultrafiltered lignin could be produced at a concentration of 230 g L$^{-1}$ for as little as $180 per ton.[17] This combination of low cost, sustainability (waste to energy), earth abundance, and nontoxicity supports the use of lignin and ligninsulfonate as a very appealing flow battery chemistry.

A first embodiment is an electrolyte for a flow battery, comprising lignin or ligninsulfonate, dissolved in a liquid.

As used herein, "lignin" refers to the biopolymer lignin as obtained from plant biomass (e.g., wood or bark). Lignins include ligninsulphonates (isolated from sulfite pulping), kraft lignins (isolated from kraft pulping black liquor), organosolv lignins (isolated from organosolv pulping), soda lignins (isolated from soda pulping) and lignin residue after enzymatic treatment of biomass.

A first embodiment is an electrolyte for a flow battery, comprising lignin or ligninsulfonate dissolved in a liquid.

In a first aspect of the first embodiment, the liquid is aqueous. In another aspect of the first embodiment or any aspect thereof, the liquid comprises deionized water. In another aspect of the first embodiment or any aspect thereof, a base has been added to the liquid. In another aspect of the first embodiment or any aspect thereof, a base has been added to the liquid or the liquid is a base, and the base is sodium hydroxide. In another aspect of the first embodiment or any aspect thereof, an acid has been added to the liquid. In another aspect of the first embodiment or any aspect thereof, an acid has been added to the liquid or the liquid is an acid, and the acid is perchloric acid or acetic acid. In another aspect of the first embodiment or any aspect thereof, the electrolyte comprises lignin or ligninsulfonate at a concentration of about 250 to about 1000 g per liter. In another aspect of the first embodiment or any aspect thereof, the electrolyte comprises acid at a concentration of 0.05 M to 0.2M. In another aspect of the first embodiment or any aspect thereof, the liquid is characterized by a pH from about 1 to about 5. In another aspect of the first embodiment or any aspect thereof, the lignin or ligninsulfonate is ultrafiltered lignin or ultrafiltered ligninsulfonate. In another aspect of the first embodiment or any aspect thereof, the electrolyte is inviscid. In another aspect of the first embodiment or any aspect thereof, the electrolyte has a dynamic viscosity of about 1 cP to about 100 cP. In another aspect of the first embodiment or any aspect thereof, the lignin or ligninsulfonate, has an average molecular weight of about 1,500 to about 5,000 g/mol. In another aspect of the first embodiment or any aspect thereof, the lignin or ligninsulfonate, has an average molecular weight of about 4,000 g/mol. In another aspect of the first embodiment or any aspect thereof, the lignin or ligninsulfonate, has an average molecular weight of 4,000 g/mol. In another aspect of the first embodiment or any aspect thereof, the lignin or ligninsulfonate has an average phenol group concentration of about 0.5 mmol $g^{-1}$ to 2.0 mmol $g^{-1}$. In another aspect of the first embodiment or any aspect thereof, the lignin or ligninsulfonate has an average phenol group concentration of about 1.11 mmol $g^{-1}$, an average molecular weight of about 4,000 g/mol. In another aspect of the first embodiment or any aspect thereof, the lignin or ligninsulfonate has an average phenol group concentration of about 1.11 mmol $g^{-1}$, an average molecular weight of 4,000 g/mol. In another aspect of the first embodiment or any aspect thereof, the lignin or ligninsulfonate is a natural biopolymer. In another aspect of the first embodiment or any aspect thereof, the lignin or ligninsulfonate is obtained from black liquor. In another aspect of the first embodiment or any aspect thereof, the electrolyte does not include a precious metal catalyst.

A second embodiment is an electrolyte for a flow battery, comprising lignin or ligninsulfonate dissolved in an aqueous liquid characterized by a pH from about 1 to about 5.

In a first aspect of the second embodiment the liquid comprises deionized water. In another aspect of the second embodiment or any aspect thereof, an acid has been added to the liquid or the liquid is an acid, and the acid is perchloric acid or acetic acid. In another aspect of the second embodiment or any aspect thereof, the electrolyte comprises lignin or ligninsulfonate at a concentration of about 250 to about 1000 g per liter. In another aspect of the second embodiment or any aspect thereof, the electrolyte comprises acid at a concentration of 0.05 M to 0.2M. In another aspect of the second embodiment or any aspect thereof, the lignin or ligninsulfonate is ultrafiltered lignin or ultrafiltered ligninsulfonate. In another aspect of the second embodiment or any aspect thereof, the electrolyte is inviscid. In another aspect of the second embodiment or any aspect thereof, the electrolyte has a dynamic viscosity of about 1 cP to about 100 cP. In another aspect of the second embodiment or any aspect thereof, the lignin or ligninsulfonate, has an average molecular weight of about 1,500 to about 5,000 g/mol. In another aspect of the second embodiment or any aspect thereof, the lignin or ligninsulfonate, has an average molecular weight of about 4,000 g/mol. In another aspect of the second embodiment or any aspect thereof, the lignin or ligninsulfonate, has an average molecular weight of 4,000 g/mol. In another aspect of the second embodiment or any aspect thereof, the lignin or ligninsulfonate has an average phenol group concentration of about 0.5 mmol $g^{-1}$ to 2.0 mmol $g^{-1}$. In another aspect of the second embodiment or any aspect thereof, the lignin or ligninsulfonate has an average phenol group concentration of about 1.11 mmol $g^{-1}$, an average molecular weight of about 4,000 g/mol. In another aspect of the second embodiment or any aspect thereof, the lignin or ligninsulfonate has an average phenol group concentration of about 1.11 mmol $g^{-1}$, an average molecular weight of 4,000 g/mol. In another aspect of the second embodiment or any aspect thereof, the lignin or ligninsulfonate is a natural biopolymer. In another aspect of the second embodiment or any aspect thereof, the lignin or ligninsulfonate is obtained from black liquor. In another aspect of the second embodiment or any aspect thereof, the electrolyte does not include a precious metal catalyst.

A third embodiment is an electrolyte for a flow battery, comprising ultrafiltered lignin or ultrafiltered ligninsulfonate dissolved in an aqueous liquid containing deionized water, the electrolyte being characterized by a pH value of 1 to 5, and comprising ultrafiltered lignin or ultrafiltered ligninsulfonate at a concentration of about 250 g to about 1000 g per liter of electrolyte.

In a first aspect of the third embodiment, an acid has been added to the liquid. In another aspect of the third embodiment or any aspect thereof, an acid has been added to the liquid or the liquid is an acid, and the acid is perchloric acid or acetic acid. In another aspect of the third embodiment or any aspect thereof, the electrolyte comprises lignin or ligninsulfonate at a concentration of about 250 g to about 1000 g per liter. In another aspect of the third embodiment or any aspect thereof, the electrolyte comprises acid at a concentration of 0.05 M to 0.2M. In another aspect of the third embodiment or any aspect thereof, the electrolyte is inviscid. In another aspect of the third embodiment or any aspect thereof, the electrolyte has a dynamic viscosity of about 1 cP to about 100 cP. In another aspect of the third embodiment or any aspect thereof, the lignin or ligninsulfonate, has an average molecular weight of about 1,500 to about 5,000 g/mol. In another aspect of the third embodiment or any aspect thereof, the lignin or ligninsulfonate, has an average molecular weight of about 4,000 g/mol. In another aspect of the third embodiment or any aspect thereof, the lignin or ligninsulfonate, has an average molecular weight of 4,000 g/mol. In another aspect of the third embodiment or any aspect thereof, the lignin or ligninsulfonate has an average phenol group concentration of about 0.5 mmol $g^{-1}$ to 2.0 mmol $g^{-1}$. In another aspect of the third embodiment or any aspect thereof, the lignin or ligninsulfonate has an average phenol group concentration of about 1.11 mmol $g^{-1}$, an average molecular weight of about 4,000 g/mol. In another aspect of the third embodiment or any aspect thereof, the lignin or ligninsulfonate has an average phenol group concentration of about 1.11 mmol $g^{-1}$, an average molecular weight of 4,000 g/mol. In another aspect of the third embodiment or any aspect thereof, the lignin or ligninsulfonate is a natural biopolymer. In another aspect of the third embodiment or any aspect thereof, the lignin or ligninsulfonate is obtained from black liquor. In another aspect of the third embodiment or any aspect thereof, the electrolyte does not include a precious metal catalyst.

A fourth embodiment is a flow battery system comprising the electrolyte of the first, second, or third embodiment, or any aspect of these embodiments.

In an aspect of the fourth embodiment, the system comprising a positive half cell and a negative half cell, wherein the electrolyte is within the negative half cell. In another aspect of the third embodiment or any aspect thereof, the electrolyte comprises lignin or ligninsulfonate, and the flow battery system is adapted to discharge by electrochemically reacting phenolic hydroxyl groups of the lignin or ligninsulfonate, to keto groups, and adapted to charge by electrochemically reacting the keto groups to phenolic hydroxyl groups of the lignin or ligninsulfonate. In another aspect of the third embodiment or any aspect thereof, the flow battery system does not include a metal catalyst to drive redox reaction of the lignin or ligninsulfonate.

As used herein, "about" a value refers to the value and values in a ±5% range around the value. For example, about 4,000 g/mol refers to the values in the range from, and including, 3,800 g/mol to, and including, 4,200 g/mol.

Embodiments of flow battery systems are also provided. Conventional flow battery systems can be used with the embodiments of electrolytes described herein.

Figure 2:
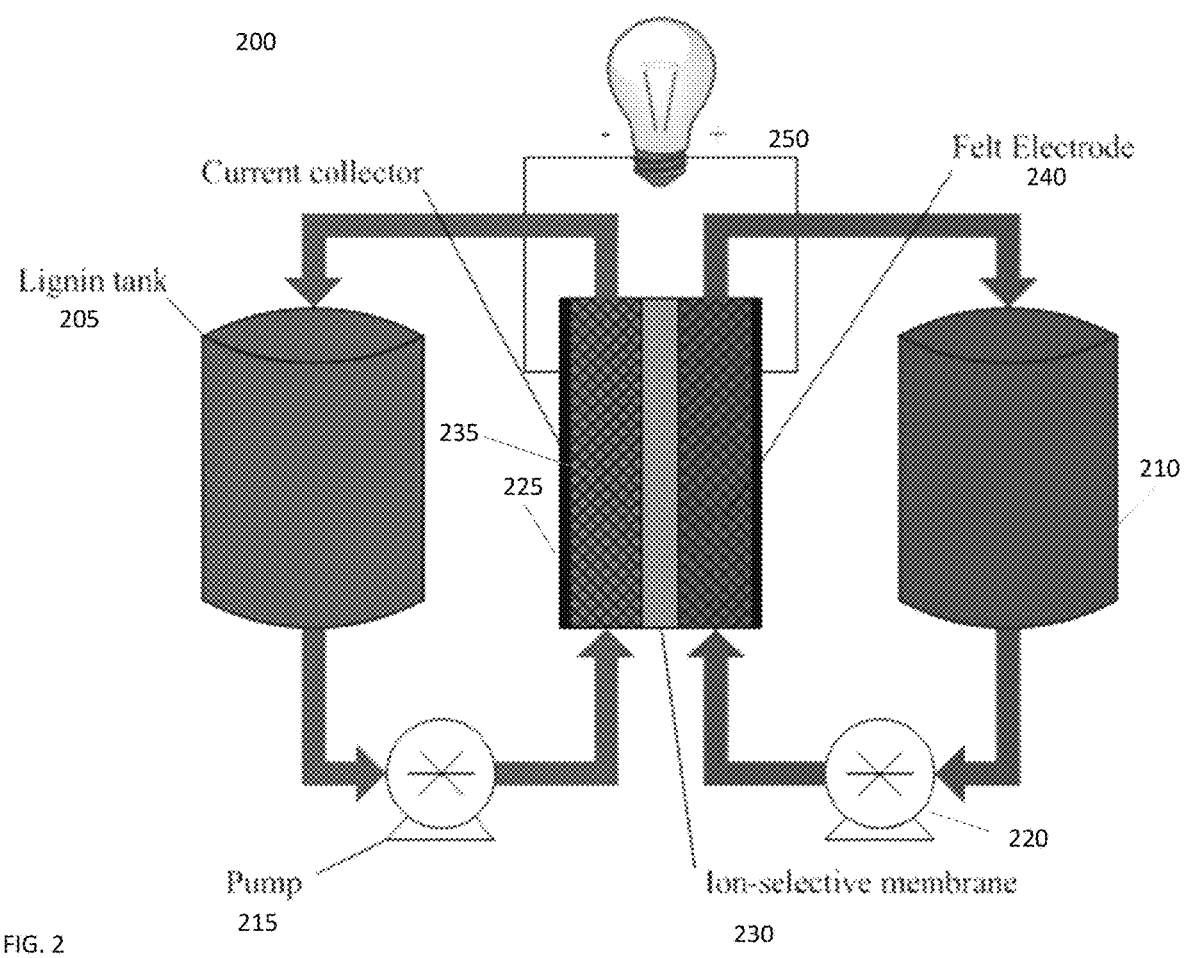
FIG. 2 provides a schematic of an embodiment of a lignin flow battery system assembly.

FIG. 2 illustrates a schematic of a typical flow battery system embodiment. The flow battery system 200 contains two electrolytes, one positive and one negative, which can each be stored in electrolyte tanks 205 and 210, outside of the battery cell itself. Each tank can have a pump, 215 and 220 respectively, to deliver the liquid electrolytes to the battery cell 225, where they are kept separate by a membrane (typically, an ion-selective membrane) 230, and back to the return of each tank. This allows the electrolytes to be circulated (typically, continuously) through the respective half cells during operation. The cell itself includes electrodes (here typically, carbon electrodes) 235 and 240 to facilitate electrochemical reactions, and is connected to a power source and sink 250, allowing electric power to move in and out of the flow battery system.

Figure 3:
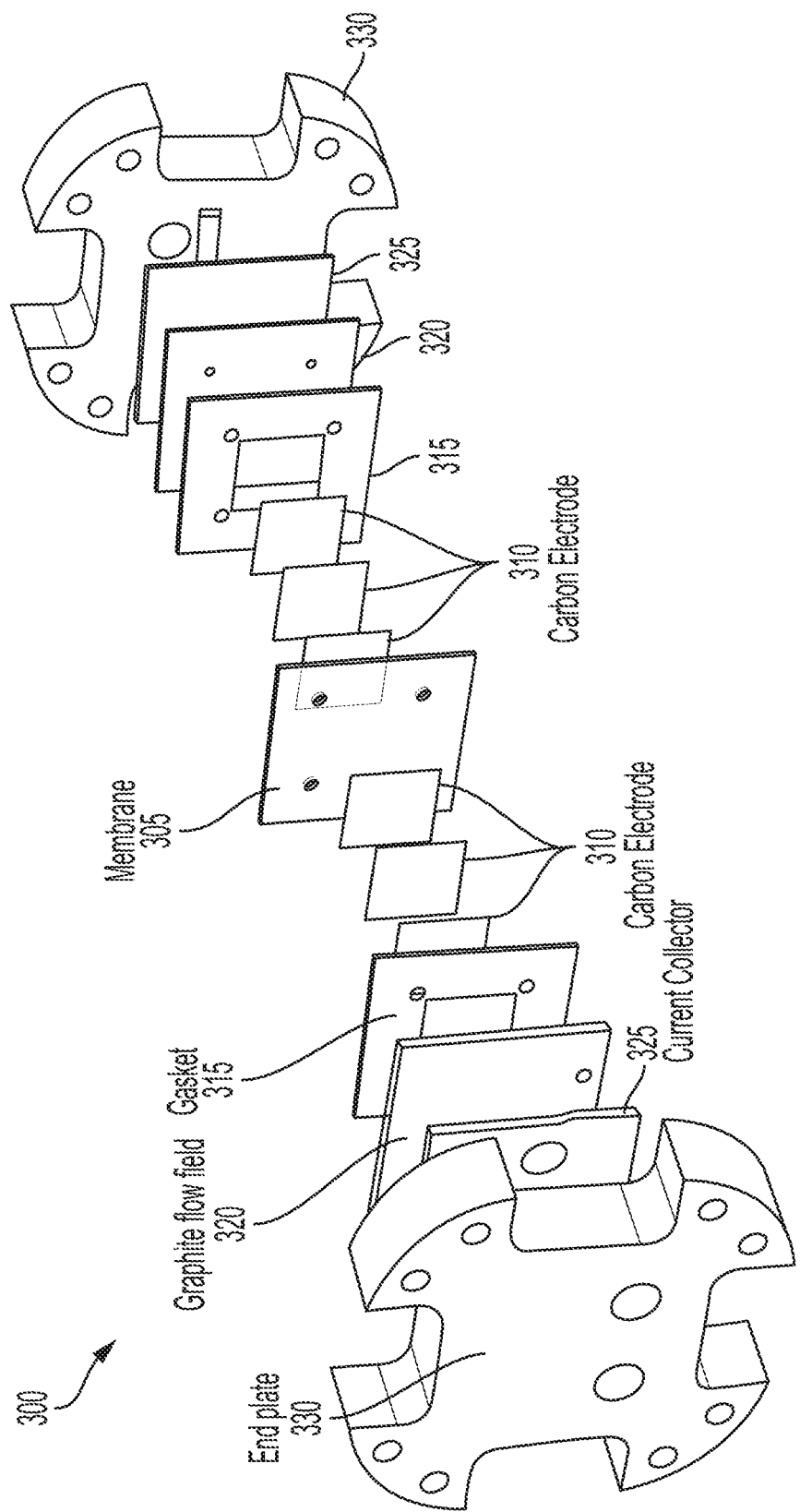
FIG. 3 provides an exploded view of an embodiment of a flow battery cell assembly suitable for use with lignin-based electrolyte. The flow battery cell comprises multiple flat layers held together by tie rods (noting that merely the holes for the tie rods through the end plates are shown).

In embodiments of the flow battery system, the system contains a battery cell. The battery cell itself can consist of a series of layers mirrored about a central membrane, as illustrated with the battery cell 300, in exploded view, in FIG. 3. While a symmetric system is illustrated, asymmetric systems are also possible; these can have different type and number of elements. The membrane 305 keeps the electrolytes separate and is electrically insulative and ionically conductive. This allows free ions to move between the two electrolytes, while encouraging free electrons to find a lower-resistance path out of the cell. Next, on either side of the membrane 305 can be one or more layers of electrode material 310, often in the form of carbon paper, cloth, or felt, to facilitate electrochemical reactions within the electrolytes. After this are some seals (e.g., gasket 315) and solid graphite plates (e.g., 320) with flow fields machined or cast into them. These allow the liquid electrolytes to flow freely through the battery while also coming into contact with the electrodes and the membrane so that ion exchange between the electrolytes can take place. On the other side of each flow field is a current collector 325 to connect the cell to an electrical source and load, and a set of pressure plates (two end plates 330) to keep the entire assembly under compression. Oftentimes, such as provided in the Example below, the function of the pressure plate and current collector can be combined into the same plate.

Figure 4:
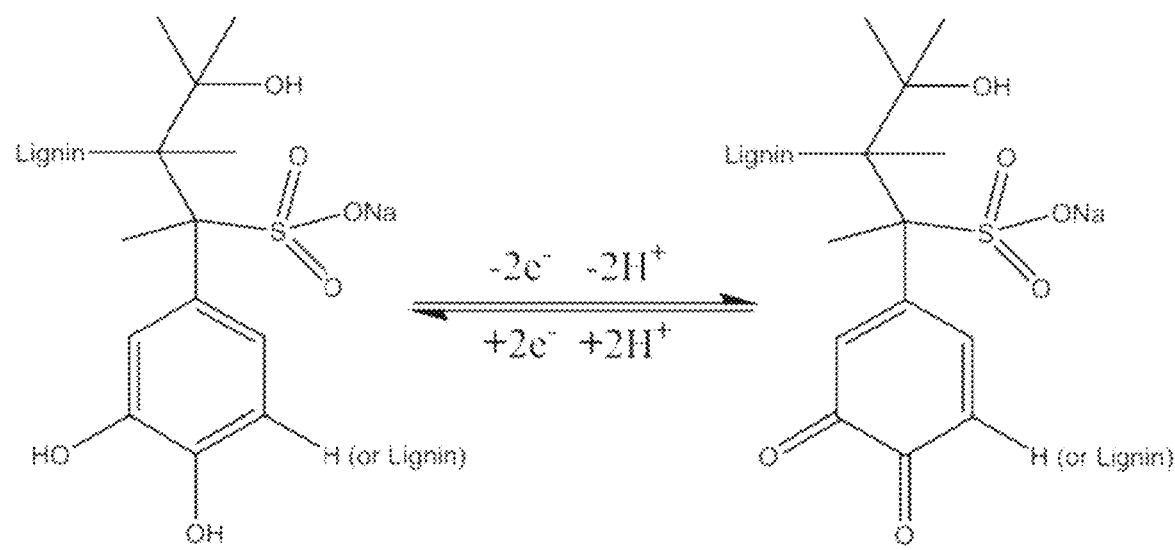
FIG. 4 provides the lignin molecule phenol-quinone reaction equation involving two electrons and two protons.

Lignin and ligninsulfonates contain naturally occurring phenol groups, which undergo a reversible two electron, two proton charge transfer when dissolved in a suitable charge carrying electrolyte and put under elevated electric potential on a carbon electrode. FIG. 4 illustrates part of a lignin molecule undergoing this phenol/quinone reaction, releasing two electrons and two hydrogen ions in the process. The lignin molecule itself is much larger than what is shown in the figure.[18,19] Still, the phenol groups are assumed to be the only part of the lignin molecule that participate in the redox reaction, and the rest of the molecule shows no signs of degradation even under repeated redox cycling.

Embodiments of the electrolyte can be used as a negative or positive electrolyte (i.e., suitable for use in the negative or positive half cell of a flow battery cell). Half cells using electrolytes based on lignins can be combined with other half cells using other electrolytes. Depending on the desired electrochemical properties and parameters of the flow battery cell, numerous different batteries with numerous properties can be assembled. As illustrated with the Example below, ligninsulfonate solution can be used as active compound of the negative electrolyte, and a solution of bromine ($Br_2$) and hydrobromic acid (HBr) can be used as the positive electrolyte. The ion and electron exchange reactions in each half cell are shown in Equation 1.

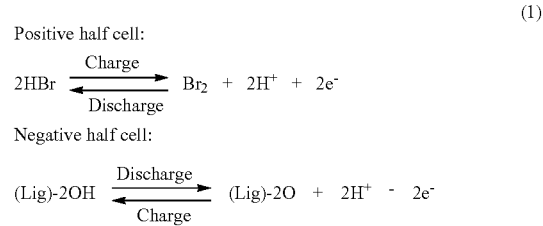

(1)

In all aqueous flow batteries, there also exists the potential for unwanted side reactions where water is split into its constituents.

Hydrogen evolution: $2H_2O + 2e^- \rightarrow H_2 + 2OH^-$

Oxygen evolution: $2H_2O \rightarrow O_2 + 4e^- + 4H^+$ (2)

These hydrogen and oxygen evolution reactions, shown in Equation 2, are harmful for several reasons. Perhaps the most obvious reason is that the water splitting causes water to exit the system as the battery operates, which leads to loss of water, and increase in electrolyte concentration. This can, in turn, increase the viscosity of the electrolyte, thus leading to overpressure and clogging problems in the flow field, and in extreme cases can even lead to the active materials dropping out of solution. These side reactions also must be avoided as they are driven by electrical energy, which would otherwise be going to charging and discharging the desired redox reaction, and therefore decrease the performance and efficiency of the battery. In some cases, gas bubbles have even been known to form and stay on the electrode surfaces, thus decreasing the contact area of the electrodes and decreasing overall efficiency.[20] These side reactions occur when the battery is operated outside of certain voltage boundaries, which are dependent on the pH and presence of catalysts in the system. As illustrated with the Example below, the voltage boundaries can be limited in order to minimize the hydrogen and oxygen evolution side reactions.

Flow batteries are complex systems, with many chemical, electrical, and mechanical factors driving their overall performance. The most impactful of these factors are discussed in this section.

The Open Circuit Voltage (OCV) of the battery is the voltage difference between the two half cells when no electric current is passing through the external circuit.[21] This voltage is of great importance to flow battery systems because it determines the amount of energy that is supplied or stored per unit charge passed. In thermodynamic terms, this is the difference between the standard potential for the anode and cathode, or:

$$E^0_{cell} = E^0_{anode} - E^0_{cathode} = E^0_{positive} - E^0_{negative}$$ (3)

The $Br_2$/HBr reaction on the positive side is well known to have a standard potential of +1.06 V vs. normal hydrogen electrode (NHE)[1] whereas the lignin reaction on the negative side was measured (see below Example) to be between +0.36 and +0.66 V when corrected for NHE depending on the specific lignin material used. Equation 3 leads to OCV's of the lignin/bromine battery between approximately 0.4 and 0.7 volts depending on the lignin used. For commercial applications, other electrolytes can be chosen as counterpart to the lignin electrolyte half-cell to achieve higher voltage ranges.

In embodiments, the lignin-based electrolytes are characterized by a potential of between +0.36 and +0.66 V when corrected for NHE.

In embodiments, a flow battery cell comprising a lignin-based electrolyte in one half cell, can be combined with a convention electrolyte or half cell such that the flow battery cell is characterized by an OCV between about 0.4V and 1.5 V, or between 0.4V and 1.0 V, or between 0.4 V and 0.7 V.

There are many ways to express the efficiency of battery systems. Two of the most common are the current and voltage efficiency. Current efficiency (also referred to as coulombic efficiency) is defined as the ratio of discharge capacity to charge capacity per cycle, or $$\eta_c = \frac{\int_0^{t_d} i_d dt}{\int_0^{t_c} i_c dt} \quad (4)$$

Where i is the current, and t is the time of charge or discharge.[22] In this work the current efficiency is calculated during constant current cycling, by dividing the discharge time by the charge time of the previous half cycle.

The voltage efficiency is also of fundamental importance to battery systems. Voltage efficiency varies with state of charge (SOC) and current density, and is given for a certain SOC and current density as $$\eta_V = \frac{V_{OC} - i_d r_p}{V_{OC} + i_c r_p} \quad (5)$$

Where $V_{OC}$ is the OCV at the given SOC, and $r_p$ is the polarization resistance.[23]

Capacity retention throughout multiple charge discharge cycles is another important metric in flow battery qualification. The primary cause of capacity decay for most flow batteries is active material crossover through the membrane.[24] Another potential way to lose capacity, which the lignin battery appears to be susceptible to, is degradation of the organic electrolyte due to unwanted oxygen bonding.[25] During cyclic tests at constant current density, the capacity retention of the battery per cycle can be determined by dividing the discharge time of the $n^{th}$ cycle by the discharge time of the n−1 cycle.4 Flow batteries also experience another, less damaging form of membrane crossover known as "water transport." Water transport, as its name implies, is the migration of water molecules across the membrane mainly due to the differential pressure driven osmosis of water through the membrane, and the electroosmotic convection caused by the viscous interactions between the water and the migrating hydrogen ions.[26] This can lead to unwanted changes in the concentration of the two electrolytes during each cycle, and over time can lead to the complete depletion of one tank and overflow of the other if there is a net amount of water transport after each complete cycle.

Figure 5:
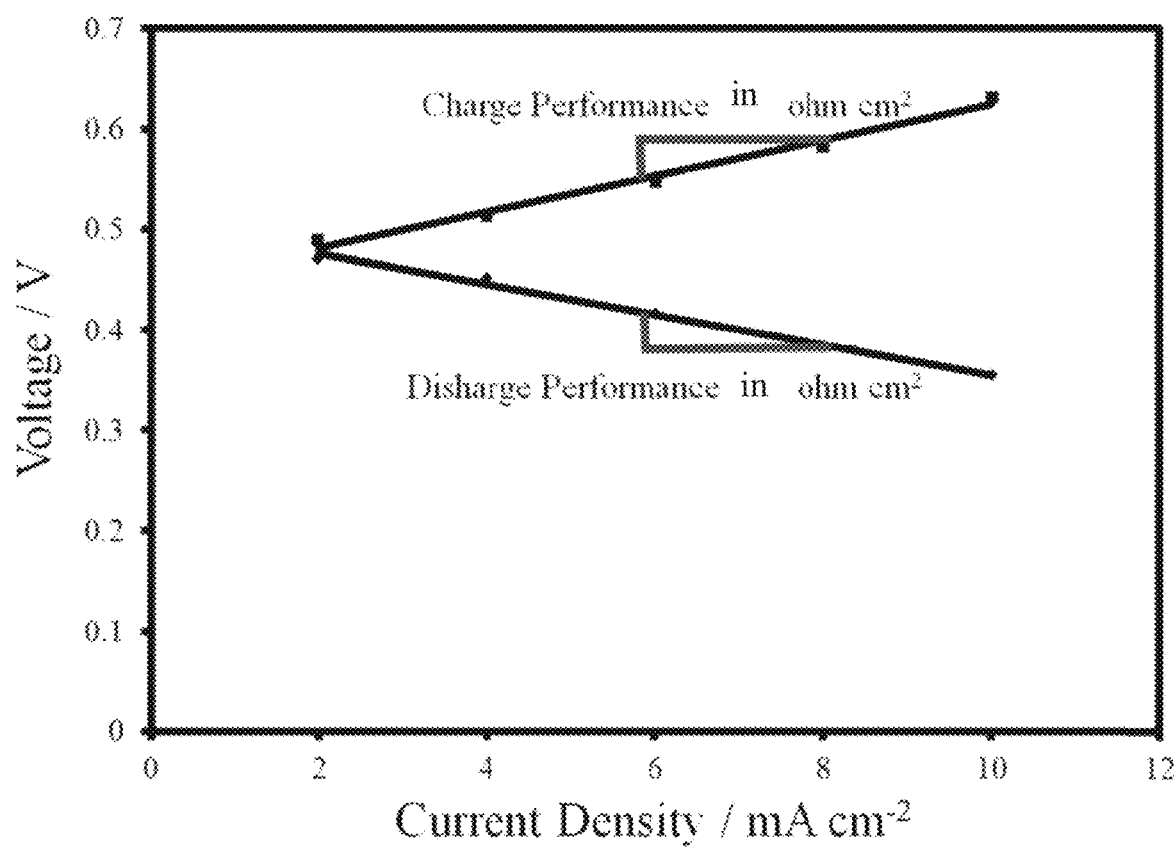
FIG. 5 provides an example of a polarization curve in which the overall cell resistance is determined by the slope of the curve.

Electrochemical battery theory breaks battery cell resistance into four major components, which are activation, mass transport, ionic, and electronic resistance. The bulk resistance of the battery cell is defined by its polarization curve, which is the slope of the voltage vs current density as shown in FIG. 5. This is because, unlike many conventional resistors, battery resistance changes with current. Activation losses cause overpotential in the battery due to the electrochemical kinetics of the electrolyte solutions on the electrodes. Essentially, activation losses are the physical resistance of the electrolyte/electrode pair to perform the desired redox reaction, due to the speed of the reaction.[27] In any flow battery system, a potential higher than the thermodynamic equilibrium value needs to be applied in order to transfer electrons and ions between the electrolytes. Typically, the activation overpotential can be calculated using the Butler-Volmer equation:

$$i = i_o \times \left\{ \exp\left[\frac{\alpha_a zF}{RT}(E - E_{eq})\right] - \exp\left[\frac{\alpha_c zF}{RT}(E - E_{eq})\right] \right\} \quad (6)$$

Rearranging gives:

$$O_{activation} = \frac{RT}{\alpha_a zF}\ln(i) - \frac{RT}{\alpha_c zF}\ln(i_o) \quad (7)$$

Where E is the electrode potential, $E_{eq}$ is equilibrium potential, $\eta_{activation} = (E-E_{eq})$ is the activation overpotential, z is the number of participating electrons, a is the charge transfer coefficient, and i and i0 are the electrode current density and exchange current density, respectively.[28]

Figure 6:
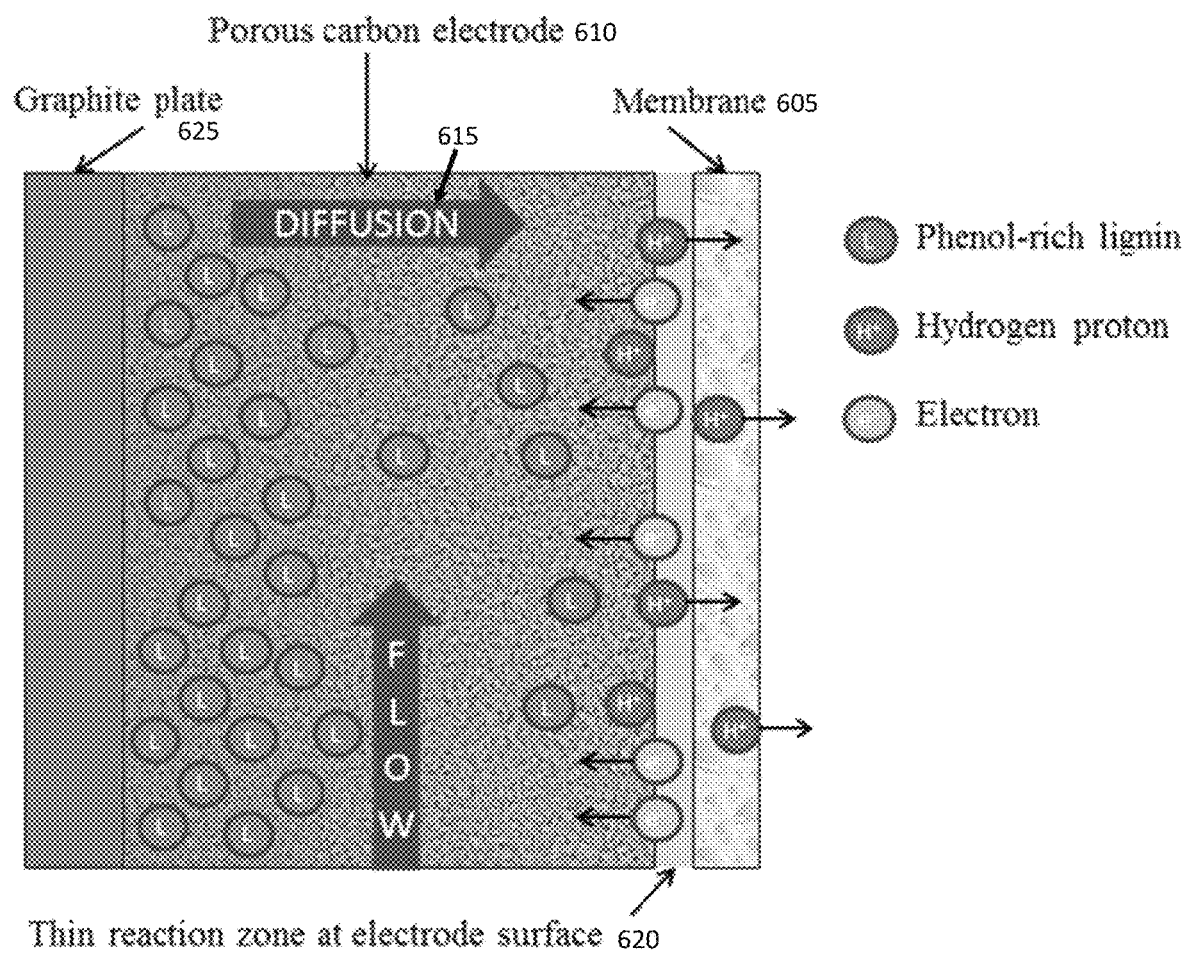
FIG. 6 provides a schematic of mass transport limitation mechanism (not to scale). The reaction at the electrode surface is limited by the rate at which active materials can be removed and replaced.

Mass transport losses are the result of concentration gradients of the active materials in the electrolyte at the electrode surfaces. As the redox reaction occurs on the surface of the electrode, areas where the reaction has taken place are depleted of ions that can participate in the reaction, and thus the products need to be removed from the reaction zone so that they can be replaced with fresh reactants. Furthermore, electron transfers will only occur on a thin reaction layer, usually less than 1 nanometer thick, between the surface of the electrode and the electrolyte.[27] A schematic of this is shown in FIG. 6. As ions travel across the membrane 605 and into the other electrolyte, and electrons travel through the electrode 610 and out of the battery system, they are replenished via diffusion 615 of unreacted electrolyte (L) through the electrode. If the reaction in the reaction zone 620 occurs faster than the reactive species are being replenished, then mass transport overpotential will occur.[27] As current density increases this resistance to diffusion becomes more and more limiting.

There are many ways to mitigate the effects of these diffusion limitations, however most of these have other adverse effects on the battery system performance. For instance, the flow field design can be modified to encourage diffusion towards the reaction zone. Interdigitated flow field designs with tapered flow channels and multiple passes have been shown to have a positive effect on mass transport resistance, but these designs often lead to higher liquid pressure drop through the flow field.[29] Similarly, increasing electrolyte flow rate will have the same effect of encouraging active materials to contact the membrane, while in turn increasing pressure drop through the cell, parasitic pumping loads on the flow battery system, and wear on the system components.

Figure 7:
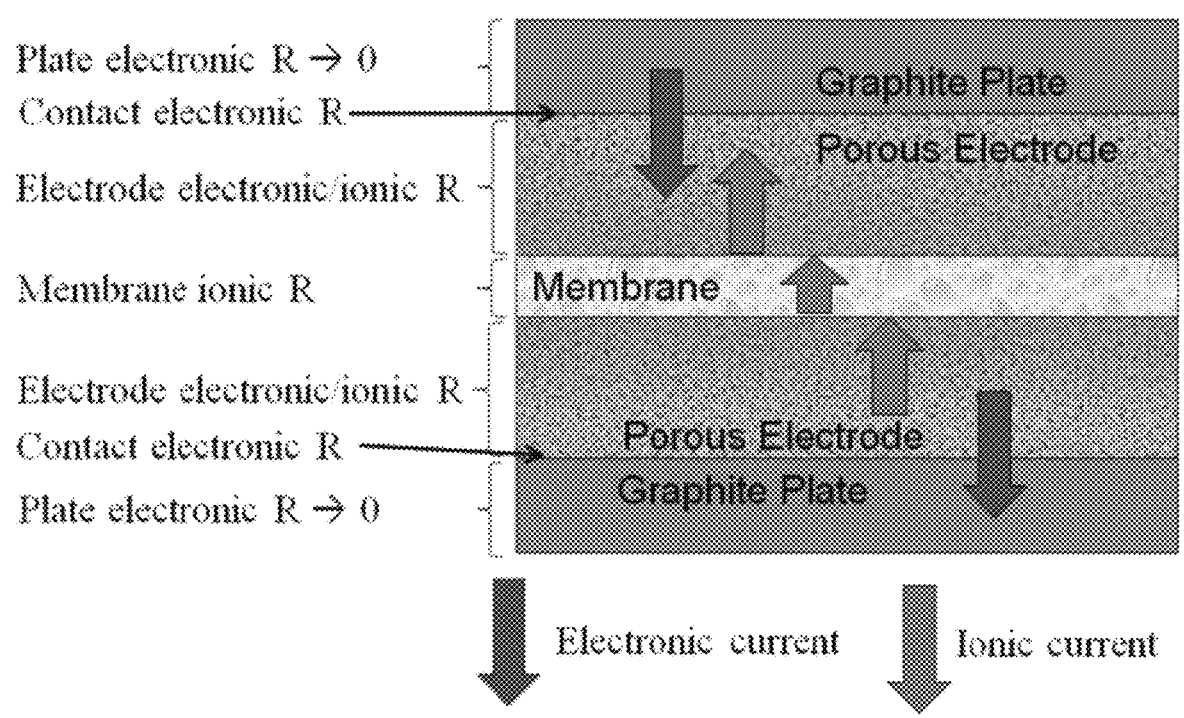
FIG. 7 provides a schematic illustrating the infrared (IR) losses in a full redox flow cell. While electronic resistance through the solid parts of the battery are negligible, electronic and ionic resistances through the electrolytes and soft goods can be substantial.

The other major cause of overpotential is IR loss, which are losses due to electrical and ionic resistance in the various parts of the flow battery. In order to do useful electrical work outside of the battery systems, the electrons need to travel through essentially all of the solid parts of the cell in order to make their exit, including the electrode, carbon plate, and current collector. They encounter electrical resistance while travelling through each one of these zones, although often times the graphite plates and current collectors are sufficiently designed so that their imposed electronic resistance is negligible. There are also contact losses between all of these parts, which must be taken into consideration when determining materials of construction, machining tolerances, and assembly methods of the battery cell.[30] Ionic losses are due to the ionic resistances in the electrolyte and the ion exchange membrane. FIG. 7 shows a summary of IR losses for a fuel cell.

In a well-designed flow battery cell, ionic losses dominate electronic losses. Ionic losses in the membrane can easily be combated by decreasing the thickness of the membrane. However, as the membrane thickness decreases the mechanical strength of the membrane also decreases, and active material crossover generally increases. Thus, a balance between these factors must be achieved along with appropriate pretreatment methods in order to optimize the membrane design.

Because the differences between mass transport overpotential and ionic overpotential can be difficult to measure directly, polarization curves of the various battery/electrolyte configurations can be measured in order to quantify the overall battery performance. Electronic resistance can easily be measured by assembling cell hardware without an ion exchange membrane in place, while activation overpotential and reaction kinetics can be determined via half-cell measurements of the electrolytes.

The cyclic stability of a flow battery system is important. Most commercial applications for flow batteries require that they last for several years in order to recuperate the relatively high setup cost of installing a flow battery system. During this time the batteries are usually cycled at least daily, requiring tens to hundreds of thousands of cycles over the life of the device.[31, 32] Cyclic stability can be measured using a number of metrics, with perhaps the most important being loss of current efficiency and capacity retention.

Some of the known mechanisms that will lead to both current efficiency and capacity retention loss do so by deactivating the redox active species. This can occur from decomposition of the active material, active material crossover through the ion exchange membrane, or from external leakage.[23] Losses to both of these metrics can also be induced from unwanted side reactions, such as the water splitting reactions mentioned above.

Figure 8:
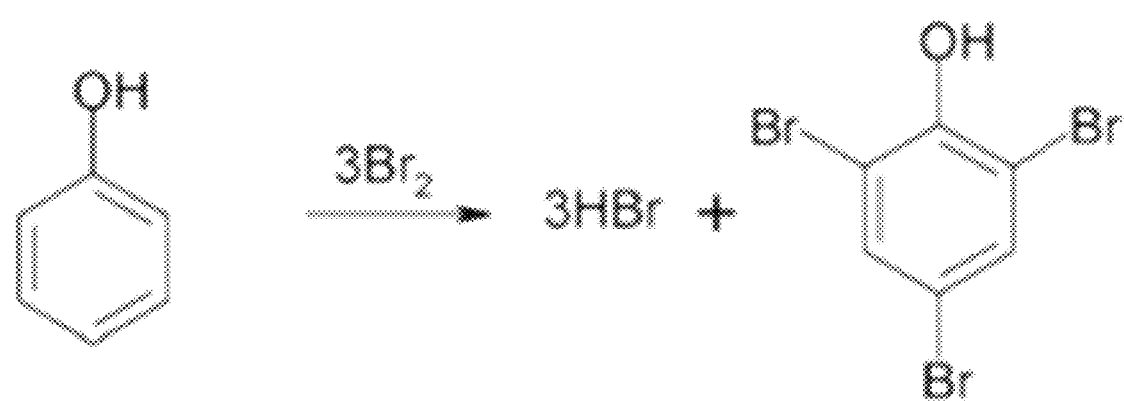
FIG. 8 provides a chemical reaction equation for a possible phenol halogenation.

Like other organic battery electrolytes, there also exists the potential for loss of current efficiency due to other side reactions that involve unwanted bonding with the organic active material. These can occur from $Br_2$ crossover into the lignin electrolyte, or from oxygen permeating the flow battery system.[23] An example of this is shown in FIG. 8, where the phenol group undergoes halogenation even in the absence of a catalyst because of the presence of the highly activating hydroxyl group.[33] In both the bromine crossover and oxygen permeation cases a reduction reaction occurs, which leads to current efficiency loss as the electrons involved do not need to travel through the external circuit.[23]

There are other variables that have a significant impact on the overall performance of the flow battery, mostly having to do with the physical and mechanical properties of the electrolytes and materials of construction. These include the wettability and pretreatment methods used for the electrodes and ion exchange membrane, the physical properties of the electrolytes, and the fluidic pressure drop in the flow battery system. Flow battery electrodes are most often built out of porous carbon materials, in the form of carbon cloth, paper, or felts. There are various methods of mechanical, thermal, and chemical treatments that have been studied, which can have a strong impact on the electrode performance.[34] In particular, increasing the wettability helps improve electrolyte accessibility and can have a marked effect on performance.[35] The ion exchange membranes have also shown the benefits of improved ionic conductivity and decreased active material permeability when subjected to certain pretreatment methods.[36] The physical properties of the electrolytes, besides their redox characteristics, will also affect the performance and cost of the battery system. The pH of both electrolytes needs to be kept in a range where they will not be overly corrosive or incompatible with common materials. The use of electrolytes with extreme pH values or overly corrosive characteristics would require that the wetted materials in the battery be built out of exotic materials that can withstand these properties. This is not cost effective in most battery systems. Furthermore, the conductivity of the electrolyte needs to be kept in a range where it will allow the flow of electricity and ions, while not being overly conductive. If an electrolyte is too conductive, excessive parasitic shunt currents will form in the battery, which are the result of voltage differences between each cell and each electrochemical stack in the battery system. These currents, although almost always present in electrochemical stacks, increase as the conductivity of the electrolyte increases.[37]

Finally, density and viscosity of the electrolytes are important in the context of parasitic losses encountered in flow battery systems. When designing a flow battery, it is tempting to push the electrolytes to their solubility limits in order to get the best energy density possible. However, this can also lead to increases in the viscosity and density of the solution, which in turn will require more pumping power to deliver reactants to and from the electrochemical stack. The pumping power in any flow battery system is considered to be a complete loss to the system efficiency, as this power does not generate useful electricity able to do work outside of the system. These losses have been found to be especially prevalent in an unmodified, organic molecule like lignin, where the useful phenol groups are only a small part of the larger lignin structure. Although highly soluble, it has been found that the large molecular structure of the ligninsulfonate rapidly increases the density and viscosity of the solution as the concentration is increased, in turn increasing the viscous drag through the system and requiring more parasitic motive power. Thus, while not necessary, it is desirable to find a balance between the abundance of active groups in the solution, and the overall physical characteristics of the pumped fluid.

Example advantages of embodiments of lignin-based electrolyte and flow battery systems:
  Many existing battery systems use high cost materials and exotic metals in their electrolyte and battery hardware design. This invention disclosure describes an electrolyte made out of low cost, abundant materials, that does not require expensive battery hardware to store energy.
  Most existing energy storage materials in batteries are toxic, environmentally hazardous, and/or flammable. Examples include lithium, bromine, chlorine, etc. Embodiments of this invention do not pose any of these hazards.
  Unlike existing sealed batteries, this flow battery design allows for independent scaling of power and energy.
  This battery electrolyte does not require any expensive catalysts to operate properly.
  A lignin-based flow battery can use an inexpensive dialysis membrane because of the lignin's large molecular structure.

Example commercial applications include grid scale energy storage, micro-grid power, backup power, remote location power, electric grid demand response, renewables integration, and frequency regulation.

Embodiments of the electrolyte use lignin which has not been used as an active species in an aqueous flow battery electrolyte. This work puts ultrafiltered ligninsulfonate solutions in a flow battery system using carbon electrodes with no expensive precious metal catalyst. The redox behavior of the lignin is shown to be relatively stable and repeatable, with the ability to be charged and discharged multiple times, and the potential for high energy densities.

ABBREVIATIONS $Br_2$: Bromine; HBr: Hydrobromic acid; $H^+$: Hydrogen (ionic form); $e^-$: Electron; OCV: Open Circuit Voltage; $E^0$: Standard thermodynamic potential; NHE: Normal hydrogen electrode; V: Volts; t: Time; I: Current; SOC: State of charge; r: Resistance; n: Cycle number; E: Electrode potential; z: Number of electrons; DI: De-ionized; L: Liter; P NMR: Phosphorus nuclear magnetic resonance; g: Gram; m: Meter; SEC: Size exclusion chromatography; UV: Ultraviolet; min: Minute; Å: Ångström; Da: Dalton; C: Celsius; s: Second; CV: Cyclic voltammogram; M: Molar; AgCl: Silver chloride; FS: Flex stak; FBH: Flow battery hardware; W: watt; U: Energy; F: Faraday's constant; A: Ampere; η: Efficiency; α: Charge transfer coefficient; O: Overpotential; °: Degrees; c: Coulomb/Charge; d: Discharge; p: polarization; V: voltage; eq: Equilibrium; el: Electrolyte.

EXAMPLE

Various candidate lignins were screened for proper physical and electrochemical properties that enable practical use in a flow battery. A single cell flow battery system was built to quantify the performance of this new electrolyte. This flow battery system was designed for the inexpensive, renewable lignin electrolyte, and did not require any precious metal catalysts or expensive materials of construction to operate properly. The ligninsulfonate electrolyte was shown to have reversible redox behavior with low capacity decay over multiple cycles in half-cell testing. The ligninsulfonate battery was able to achieve current densities of up to 20 mA $cm^{-2}$, and charge polarization resistance of 14.20 ohm $cm^{-2}$.

Experimental Methods

Material Qualification

Dissolution experiments were carried out on various lignins in order to determine types of lignin that could be candidates for inclusion in a flow battery. CleanFlow black ligninsulfonate (also hereinafter "CleanFlow"), unfiltered ligninsulfonate, and Kraft lignin from KTH Royal Institute of Technology as well as commercially available sodium ligninsulfonate from TCI America were each dissolved in solvents of DI water, hydrochloric acid, perchloric acid, and sodium hydroxide. The Kraft lignin was also dissolved in acetic acid. Each sample was comprised of 10 mL of solvent with various weights of lignin powder. After shaking, the solutions were stirred using a magnetic stirrer for approximately 1 hour at room temperature. The solutions were then left to rest at room temperature for 48 hours, after which they were visually inspected for sediment dropout. Viscosity testing was performed on candidate solutions by a Discovery HR-2 Rheometer (TA Instrument, USA) at 25° C. The samples were measured at a shear rate from 0.01 to 100 $s^{-1}$. Analysis of functional groups was performed through quantitative $^{31}P$ NMR analysis with 2-chloro-4,4,5,5-tetramethyl-1,3,2-dioxaphospholane as a derivatization reagent and eHNDI (Endo-N-Hydroxy-5-norbornene-2,3-dicarboximide) as an internal standard. Sample preparation was carried on according to Areskogh et al.[38] Signal assignment and quantification was performed as described elsewhere.[39] Molecular weight distributions of the samples were investigated by dissolving 5 mg of lyophilized samples in 2 ml of DMSO+0.5% LiBr (w/w) solution. After filtration of the samples through 0.45 um PTFE filters, size exclusion chromatography (SEC) was performed on an SEC 1260 Infinity instrument (Polymer Standard Services, Germany). The equipment consisted of an isocratic pump (G1310B), a micro degasser (G1379B) and a standard autosampler (G 1329B). The detection system included a UV detector (G 1314B) in series with a refractive index detector (G 1362A). The mobile phase was DMSO+0.5% LiBr set to a constant flow rate of 0.5 ml/min for a total run time of 65 minutes. The injection volume was 100 μL. The separation system consisted of PSS GRAM Precolumn, PSS GRAM 100 A and PSS GRAM 10000 A analytical columns thermostated at 60° C. and connected in series. The pullulan standards with nominal masses of 708 kDa, 337 kDa, 194 kDa, 47.1 kDa, 21.1 kDa, 9.6 kDa, 6.1 kDa, 1.08 kDa and 342 Da were used for standard calibration. pH and conductivity measurements were taken using an Oakton pH/CON Portable Meter (PC 450). Calibration was done at room temperature using Oakton 1413 and 12880 μS conductivity standards (WD-00653-18, WD-00606-10), and Oakton 4 and 7 pH buffers (EW-00654-00, EW-00654-04).

Electrochemcial Testing

Half-cell measurements were performed on a BioLogic SP150 single channel potentiostat controlled by BioLogic EC-Lab software. Voltage and current were logged at 0.1 mV increments. Generally the voltage was ramped between 0.1 V and 0.7 V. However some of the voltammogram traces presented in this work are trimmed for clarity and to emphasize the redox peaks. Constant scan rates of 25 and 60 mV/s were used on all of the presented data.

For cyclic voltammogram (CV) measurements on lignin solutions, 60 mg of dried lignin powder was dissolved in 50 mL of 0.1 M perchloric acid and stirred at room temperature for 5 minutes. For measurements on dried lignin, solutions of 0.1 M lignin in DI water were dropped on 10×20 mm AvCarb carbon paper (P50) working electrodes and allowed to dry for 24 hours. The working electrode with the dried lignin was then immersed in 50 mL of 0.1 M perchloric acid for CV measurements.

Figure 9:
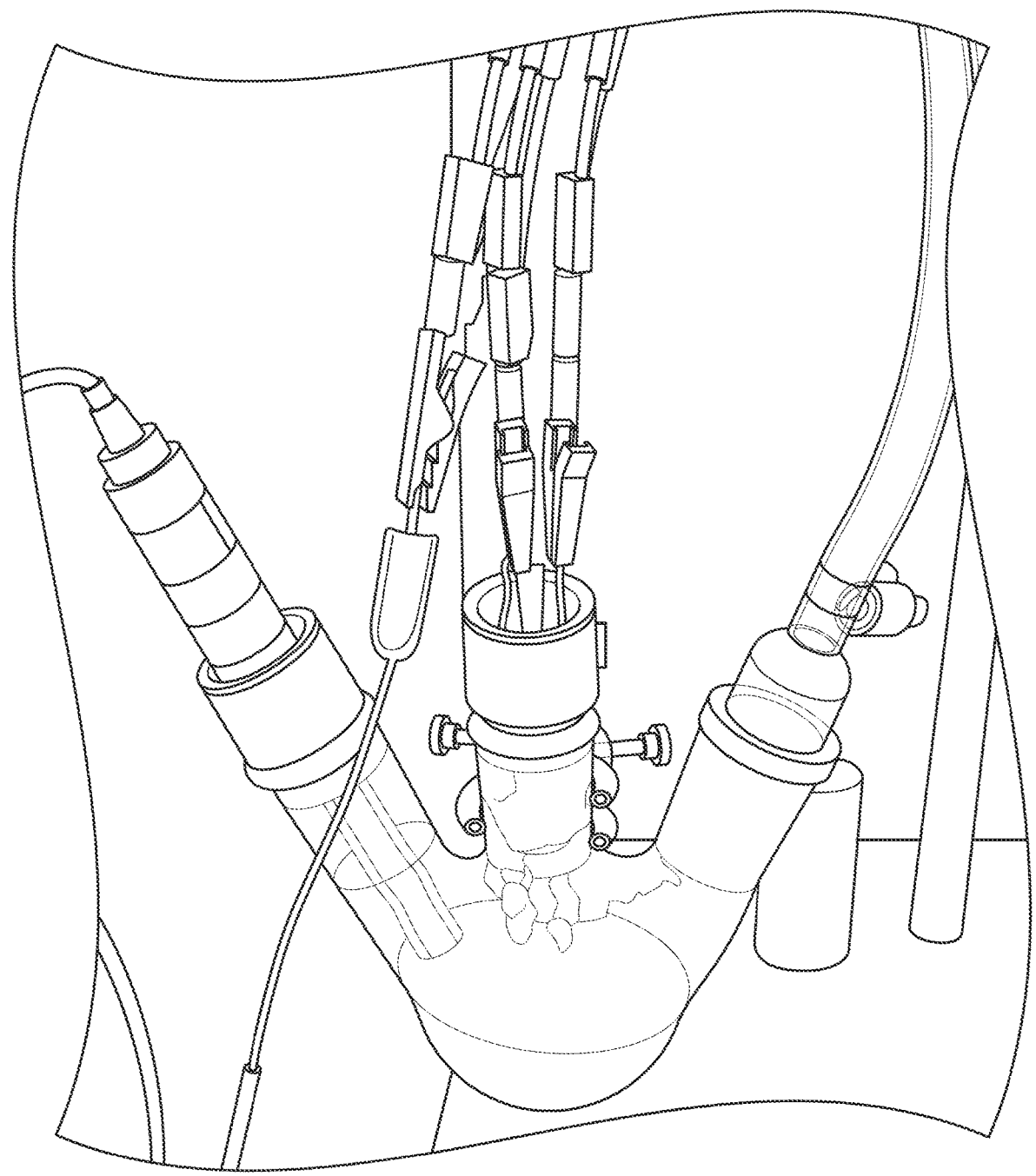
FIG. 9 provides a schematic of an example cyclic voltammogram (CV) test apparatus. The chamber was sealed and put under an inert gas headspace.

CV experiments were performed with the setup illustrated in FIG. 9. The setup included a single-junction Fisher Scientific Accumet Glass Body Ag/AgCl Reference Electrode (1362053) with 4 mol/L KCl filling solution, and a platinum foil counter electrode. A variety of working electrodes were used, including the aforementioned carbon paper, gold foil, and a 5 mm diameter glassy carbon electrode. Prior to each use, the glassy carbon electrode was polished on 600 grit paper with polishing compound, sonicated for 10 minutes in methanol, followed by a 10 minute sonication in DI water. The CV's were performed in a 125 mL 3-neck flask and purged with argon gas unless otherwise noted.

Electrolyte Preparation

For the positive electrolyte, 200 mL solutions of 0.5 M bromine and 0.25 M hydrobromic acid in DI water were used in the fully charged state. Both the bromine and hydrobromic acid were commercial material obtained from Sigma-Aldrich. The negative electrolyte solution was made by heating 50 mL of DI water to 50° C. and stirring in 0.1 M of dry ligninsulfonate powder. After the powder was thoroughly dissolved, the solution was spiked with enough 70% (w/w) perchloric acid (Sigma Aldrich) to bring the acid concentration of the solution to 0.1 M. The solutions where then loaded into 250 mL electrolyte "tanks" for use in the flow battery system.

Figure 10:
FIG. 10 provides a schematic of two containers containing electrolyte: Positive electrolyte comprised of 0.5 M bromine and 0.25 M hydrobromic acid in DI water (left); negative electrolyte comprised of 0.1 M ligninsulfonate in 0.1 M perchloric acid (right).

A photograph of each electrolyte in the charged state is shown in FIG. 10.

Flow Battery Test Apparatus

Figure 11:
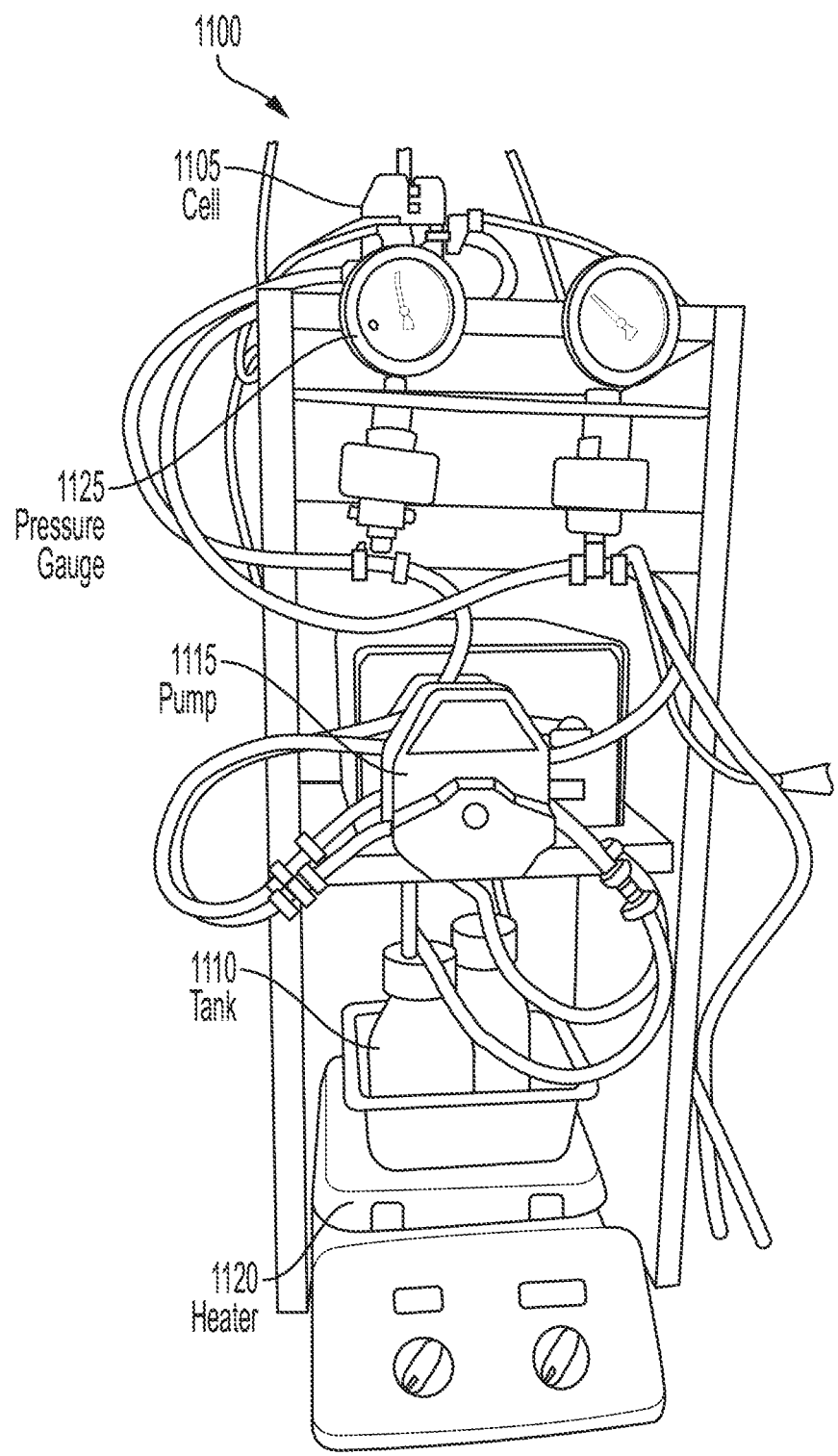
FIG. 11 provides a schematic of an embodiment of a flow battery assembly.

FIG. 11 illustrates the flow battery system 1100 that was used in this Example. The flow battery system included a single battery cell assembly 1105, two electrolyte tanks 1110, peristaltic pumps 1115 for electrolyte circulation, temperature control equipment (e.g. heater 1120), and pressure monitoring equipment (e.g., pressure gauges 1125). The electrolyte tanks used were 250 mL glass flasks. For temperature stability they were submersed in water and placed on a Fisher Scientific Isotemp Stirring Hot Plate (SP88857200). The negative electrolyte tank was sealed from the atmosphere and constantly purged with nitrogen to limit oxygen interaction with that electrolyte. Prior to entering the tank, this nitrogen was hydrated with 0.1 M perchloric acid in a liquid trap in order to prevent excessive electrolyte evaporation. The electrolyte pumps were MasterFlex LIS heads (HV-07516-02) powered by a LIS economy variable speed drive (HV-07554-80). Cell inlet pressures were monitored by analog pressure gauges with CPVC gauge guards. All interconnections were made with flexible PVC tube and barbed PVDF tube fittings. The flow battery cell was placed above the rest of the system for easy draining between tests.

Figure 12:
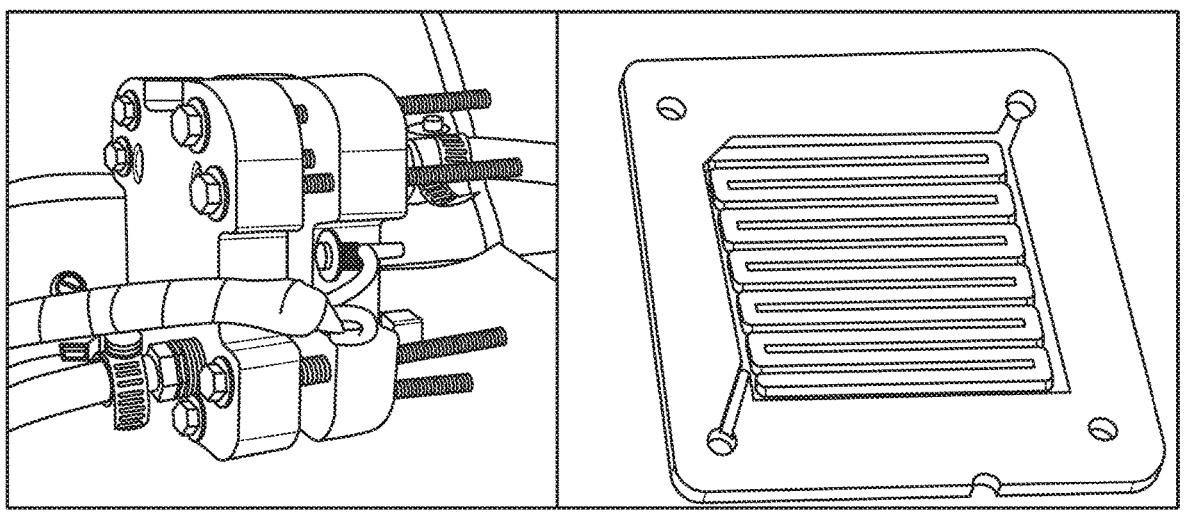
FIG. 12A provides a schematic of a flex stak (FS) cell hardware assembly.
FIG. 12B provides a schematic of the interdigitated flow field used in the cell shown in FIG. 12A.

Two cell assemblies were used to qualify the lignin flow battery. The first assembly was a Fuel Cell Store Flow Battery Flex Stak (FS) (3101603). This consisted of a single cell with a 10 cm² active area, and a machined interdigitated flow field on the solid graphite plates. Soft goods were held in place and sealed by 2 layers 1/64" PTFE gaskets on each side. The current collectors were copper, and were encased in machined PVC pressure plates. The eight machine screws along the outside of the cell were torqued to 15 in-lbs to hold the assembly together. FIG. 12A shows the FS assembly and FIG. 12B the interdigitated flow field.

Figure 13:
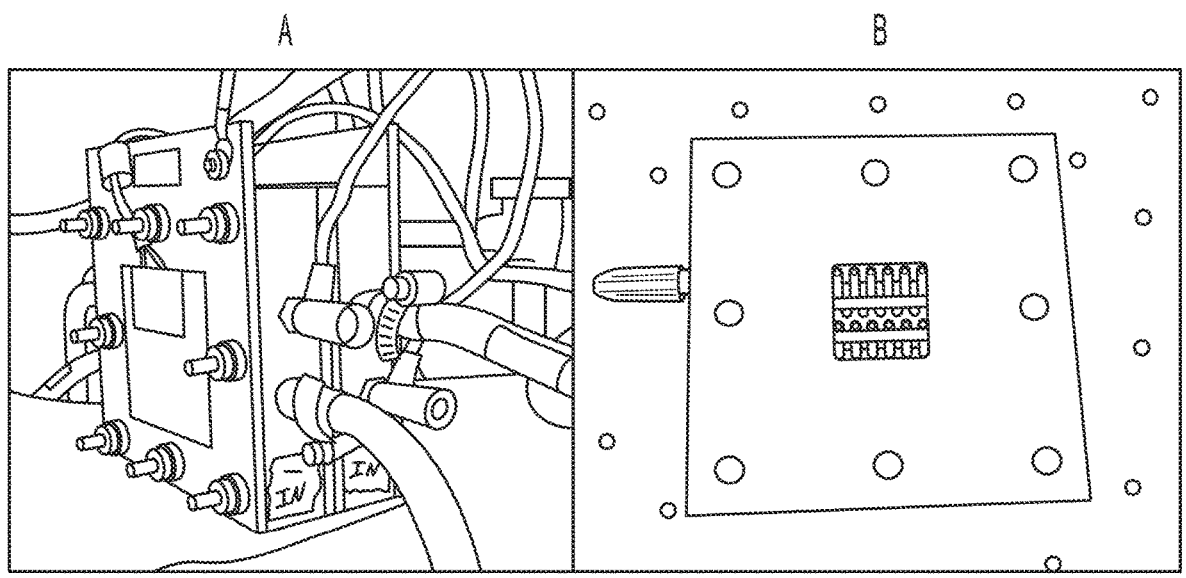
FIG. 13A provides a schematic of a flow battery hardware (FBH) assembly.
FIG. 13B provides a schematic of the column flow field used in the cell shown in FIG. 13A.

The other cell used was a Fuel Cell Store Flow Battery Hardware (FBH) assembly (72108114), consisting of a single cell, 5 cm² active area. This cell had column flow patterns machined into the solid graphite plates, with separate terminals for direct voltage referencing directly on the plate. The cell was sealed by 1/16" or 1/32" gaskets depending on the soft goods configuration used. End plates were 1/4" thick, gold plated aluminum, which also served as the current collectors. Each end plate included a 60 W heater to regulate cell temperature. The assembly was held together by 8 machine screws torqued to 15 in-lbs. FIG. 13A shows the FBH assembly and FIG. 13B the column flow field.

Figure 14:
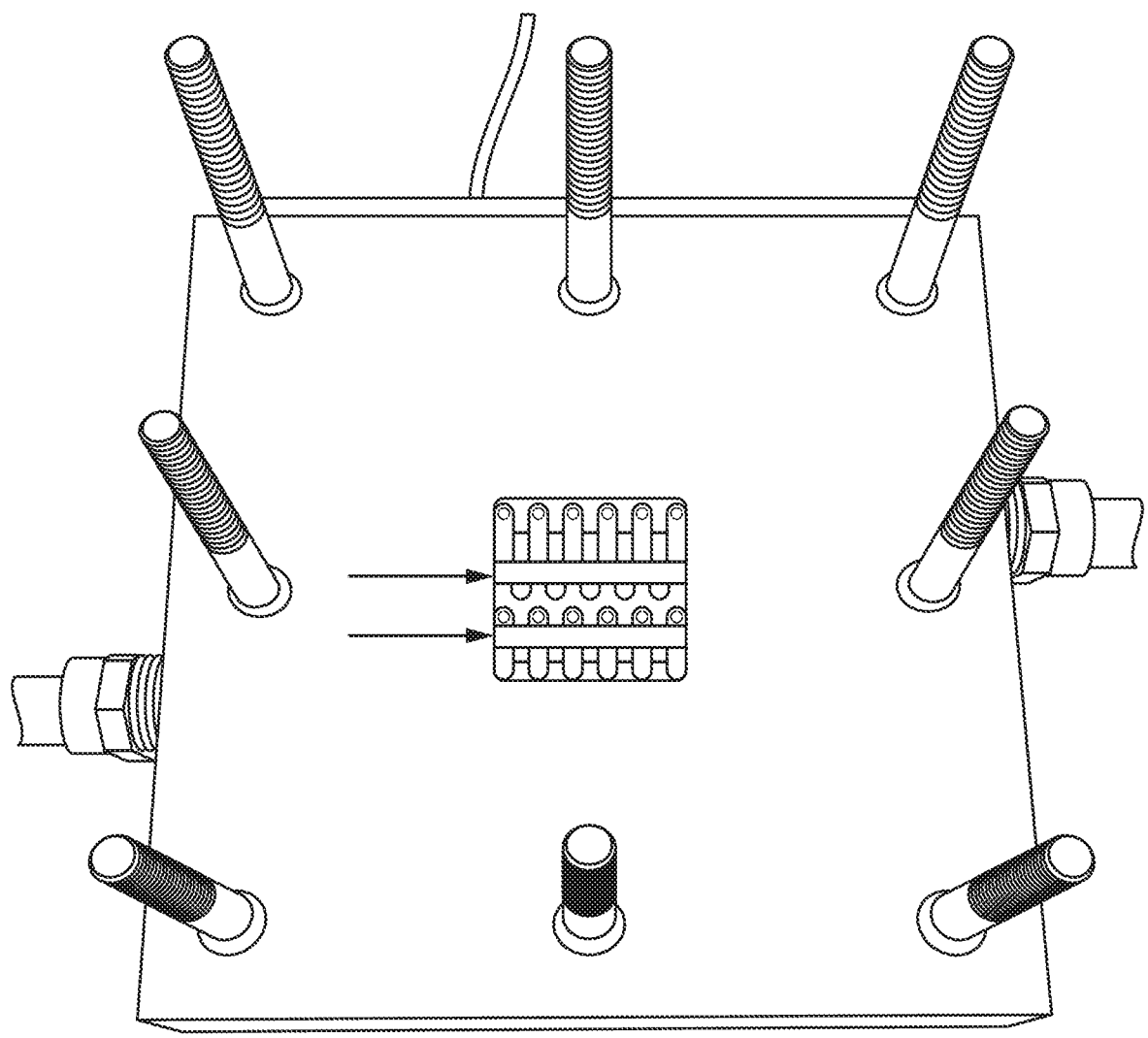
FIG. 14 provides a schematic of the column flow field with fluoroeleastomer (FKM) inserts used in the cell shown in FIG. 13A.

For certain tests, FKM o-ring material was inserted into the column flow field, in order to simulate an interdigitated flow field. This modification is indicated by the arrows in FIG. 14.

Various soft goods were used on the flow battery builds. Carbon felts and carbon papers were pre-treated using a Unaxis Plasma Therm 790 system at 13.56 MHz frequency for the plasma excitation. During the oxygen plasma treatment, system pressure and oxygen flow rate were kept constant at 2 mT and 25 sccm, respectively. RF plasma power was 150 W and the exposure time was 15 secs.

The membrane pretreatment method involved a 24 hour soak in 0.1 M perchloric acid at room temperature, followed by triple rinsing in DI water prior to loading in the cell. The various cell builds used in these experiments are summarized in Table 1.

TABLE 1

Flow battery cell build summary

| Build (#) | Hardware | PTFE Gaskets (#) | Gasket Thickness (in) | Electrode | Membrane | Flow Field Size (cm²) |
|---|---|---|---|---|---|---|
| 1 | FS | 2 | 0.0156 | 2x Cloth 1071 HCB | Nafion 115 | 10 cm interdigitated |
| 2 | FS | 2 | 0.0156 | 3x AvCarb P50 | Nafion 212 | 10 cm inter |
| 3 | FS | 2 | 0.0156 | 4x AvCarb P50 | Nafion 212 | 10 cm inter |
| 4 | FBH | 2 | 0.0625 | 2x AvCarb G100 | Nafion 212 | 5 cm column |
| 5 | FBH | 1 | 0.0313 | 7x AvCarb P50 | Nafion 212 | 5 cm column |
| 6 | FBH | 1 | 0.0313 | 7x AvCarb P50 | Nafion 212 | 5 cm column |
| 7 | FBH | 1 | 0.0313 | 7x AvCarb P50 | Nafion 212 | 5 cm inter |
| 8 | FBH | 1 | 0.0625 | 2x AvCarb G100 | Nafion 212 | 5 cm column |

The temperature of the flow battery electrolytes was maintained at 30° C., and the 2×60 W heaters on the FBH cell were plugged in during tests on that assembly. Flow rates remained constant at approximately 250 mL/min. The flow fields of all cells were configured in a co-flow pattern, with the inlet at the bottom of the cell and the outlet at the top in order to mitigate the potential for hydrogen gas vapor locking. Inlet pressures were maintained below 0.5 bar gauge, and differential pressure across the membrane was maintained below 0.1 bar differential. The battery was powered by a BioLogic MPG2 16 channel potentiostat controlled with BioLogic EC-Lab data acquisition and control software.

Theory and Methods

Theoretical energy density of the lignin electrolyte was calculated on the basis of the concentration of useful phenol groups in the lignin material. The concentration of phenol groups in the lignin can be related to theoretical energy density via Equation 8:

$$U_{el} = F \times V_{oc} \times M_{phenol} \qquad (8)$$

with $U_{el}$ equal to the energy density of the electrolyte, F as Faraday's constant, $V_{OC}$ as the OCV of the battery at its average state of charge, and $M_{phenol}$ the concentration of phenol groups per unit mass.

OCV was measured by monitoring voltage with no load on the battery system besides the voltage of self-discharge for long periods of time. Usually, this was at least one hour. For measurements where an OCV hold could not be held for such a long period of time, such as during OCV sweeps at various states of charge, the cell was taken to be at its OCV once the rate of voltage change was less than 0.01 mV/s.

Polarization curves, used to measure charge and discharge resistance, were taken by charging and discharging the battery at different rates, with 1 mA/cm$^2$ steps between measurement points. The voltage was allowed to equilibrate for 60 seconds at each current density prior to proceeding to the next step. Plots of voltage versus current were made out of this data, and a linear best fit line was plotted using graphical analysis software. The slope of this line was used to calculate the polarization resistance.

Current efficiency and capacity retention were measured over multiple galvanostatic charge discharge cycles with constant voltage limits. Current efficiency was defined as the discharge time divided by the charge time of the previous half cycle. Capacity retention was defined as the discharge time divided by the discharge time of the previous cycle.

Analysis of Results

Lignin Material Qualification

The physical properties of various candidate lignins were studied to determine electrolyte formulations for use in the lignin-based flow battery. The organic structure, molecular weight, and phenol content of ligninsulfonate varies widely depending on the feedstock it was extracted from, the extraction process used, and the methods of filtration and drying.[40] CleanFlow black ligninsulfonate, unfiltered ligninsulfonate, and Kraft lignin from KTH Royal Institute of Technology as well as commercially available sodium ligninsulfonate from TCI America were each dissolved in solvents of DI water, hydrochloric acid, perchloric acid, and sodium hydroxide. Concentrations were increased until the solution started to become noticeably more viscous, indicating that they would likely not perform well in the flow battery.

The unfiltered ligninsulfonate became highly viscous and formed a mud-like consistency even at low concentrations. Flow battery electrolytes typically have viscosity similar to that of water, and thus this particular unfiltered material was eliminated as a candidate. The Kraft lignin was soluble in sodium hydroxide, but not water or any of the acidic solvents. It was also tested in various concentrations of acetic acid, but was only soluble in very high concentrations of this solvent. An electrolyte comprised of concentrated acetic acid, while possible, would require flow battery hardware made out of expensive materials in order to avoid compatibility problems. Likewise, a basic solution is less desirable, and therefore Kraft lignin was not chosen as material for the present example. The CleanFlow lignin and TCI lignin both stayed relatively inviscid even at concentrations of up to 400 g/L, and therefore these were studied in the battery further.

Figure 15:
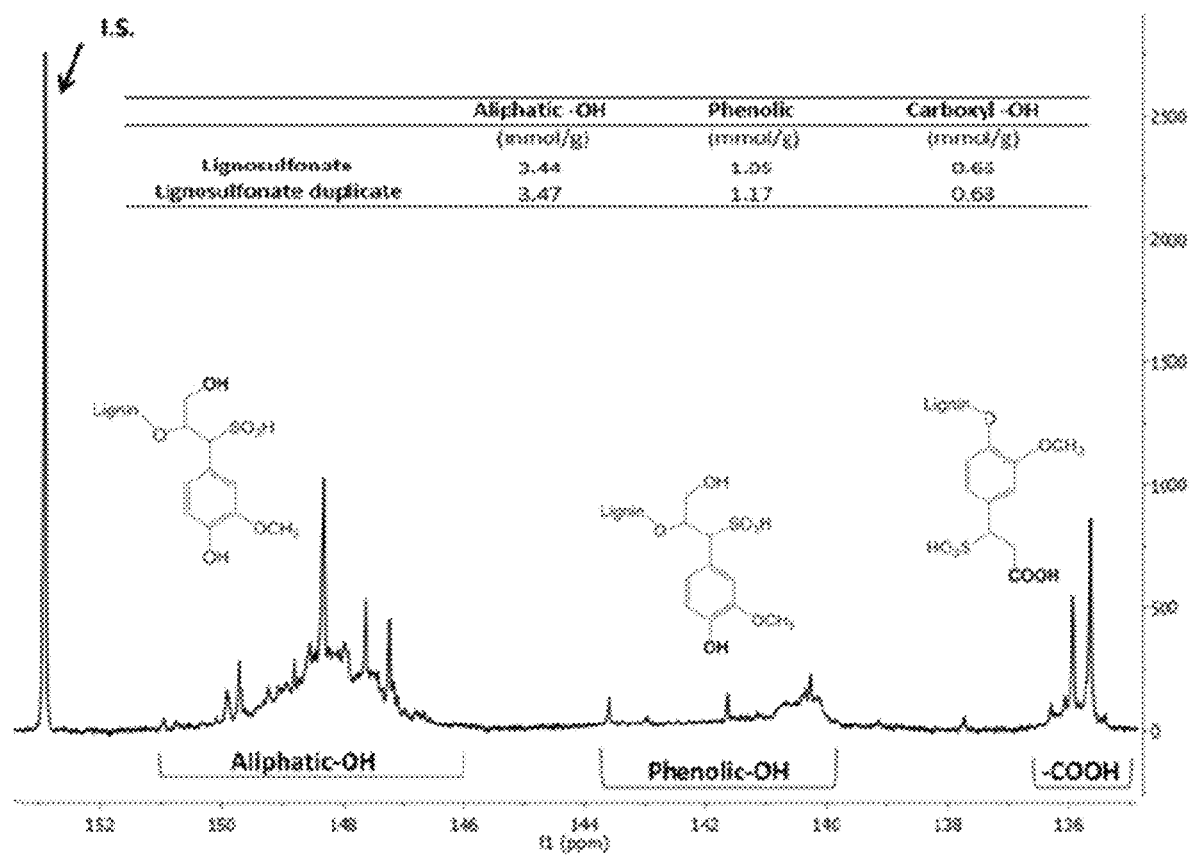
FIG. 15 provides a Phosphorus nuclear magnetic resonance (P NMR) spectrum of lignin and corresponding average con. The useful phenol groups show an average concentration of 1.11 mmol g$^{-1}$.

Size exclusion chromatography was performed on the CleanFlow ligninsulfonate sample, and yielded a molecular weight of 4,000, which is on the lower end of the molecular weight range for lignins.[41] An analysis of functional groups was performed through quantitative P NMR analysis, showing an average phenol group concentration of 1.11 mmol g$^{-1}$ for this material, as seen in FIG. 15. This combination of high phenol concentration and low molecular weight has been found to be generally desirable. The high phenol concentration ensures the presence of active materials to facilitate the redox reaction even at modest electrolyte flow rates, while the low molecular weight ensures that the viscosity of the electrolyte solution stays in a range where the material can move freely through the flow field without using excess pump power or risking damage to the ion exchange membrane. Based on these results a solution of 0.1 M lignin dissolved in 0.1 M perchloric acid was formulated for the negative electrolyte, with an approximate energy capacity of 7 Wh L-1 when used with Br$_2$/HBr as a redox couple. Higher concentrations with higher energy densities can easily be made as the ligninsulfonate material is very soluble in water and mild acids.42

Cyclic Voltammetry

Figure 16:
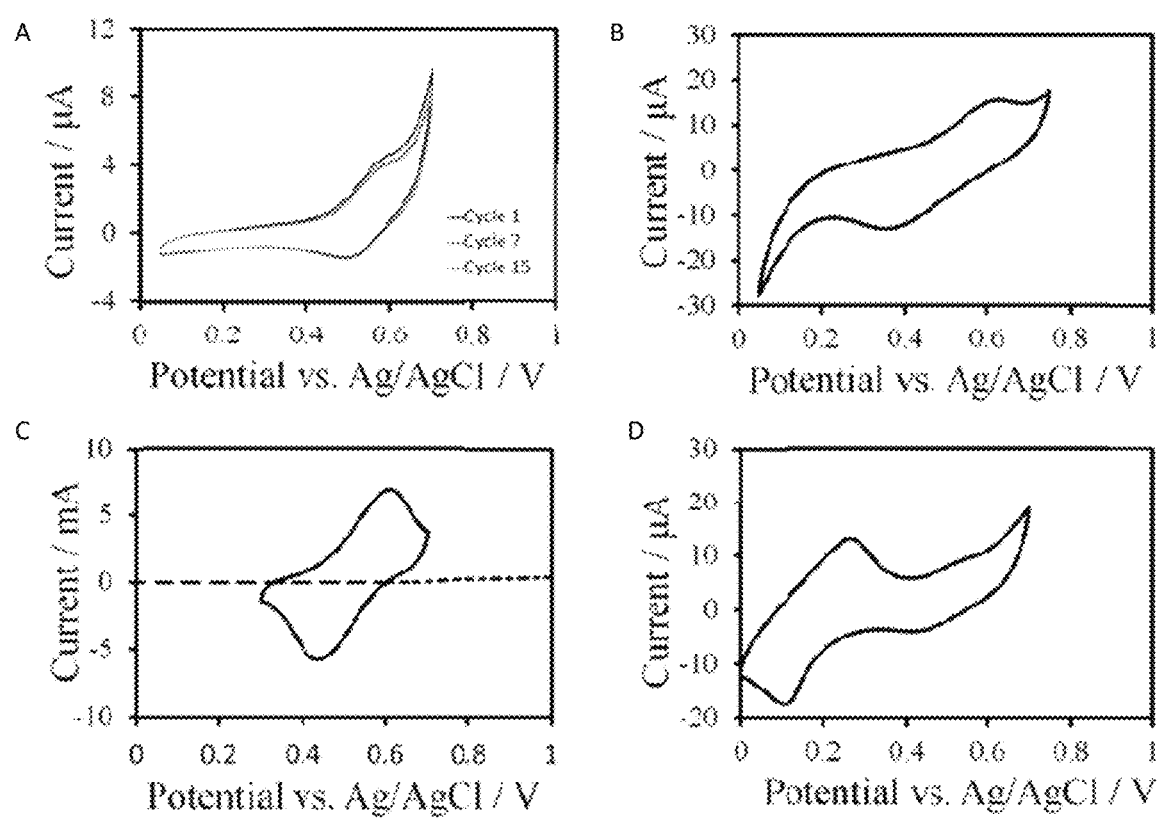
FIG. 16A provides a CV scan of lignin material with multiple cycles on a gold electrode.
FIG. 16B provides a CV scan of diluted lignin-based electrolyte on a carbon electrode.
FIG. 16C provides a CV scan of dried active material on a carbon electrode.
FIG. 16D provides a CV scan of commercially available lignin showing a second set of redox peaks.

To gain further insight into the redox reaction in the lignin phenol groups, half-cell measurements were performed on the ligninsulfonate raw material and diluted negative electrolyte. FIGS. 16A-C show cyclic voltammetry of the CleanFlow ligninsulfonate material in 0.1 M perchloric acid with various working electrodes. All show a single step electron transfer with high symmetry centering at 0.5 V vs Ag/AgCl. This is consistent with the open circuit voltage against Br$_2$/HBr in the flow battery (opposing half reaction Br$_2$+ 2e$^-$ ↔ 2Br$^-$ 0.86V vs Ag/AgCl).43 The symmetry and apparent redox reversibility are attributed to the stability of the oxidized lignin product in acidic conditions. FIGS. 16A and 16B were tested at a scan rate of 25 mV s$^{-1}$ with the lignin material in solution at a concentration of 0.3 mM. Both of these show ends which are not second peaks, but are inherent from the background trace of the supporting electrolytes. Due to the limited amount of phenol groups available in such a dilute solution the reduction and oxidation peaks are not very large, but still clearly show reversible redox behavior. FIG. 16A shows a trace of the lignin material being cycled 15 times on a gold foil working electrode without any substantial indications of irreversibility, aside from the first cycle. This reduction in peak size after the first cycle was observed consistently over a number of trials, and is likely due to dissolved oxygen in the solution oxidizing the ligninsulfonate before it is depleted. This first-cycle irreversibility is not observed in the flow battery, where the experimental setup allowed easier removal of dissolved oxygen prior to battery operation.

FIG. 16D is a CV of the TCI ligninsulfonate on a gold foil working electrode. This lignin shows a second, larger set of peaks centering around 0.2 V. The smaller peaks centered around 0.5 V that were present in the CleanFlow lignin can also be seen in the TCI lignin trace. The redox peaks at lower voltage created a larger OCV for the battery, which is beneficial to the battery performance, however this particular lignin did not show cyclic performance that was as strong as the CleanFlow material. Thus, both types of lignin continued to be tested in the flow battery system. The peak separations of these CV's are all approximately 100 mV, which is larger than the 59/n mV=29.5 mV (with n being the number of electrons involved in the redox process) expected for this reaction. This implies that equilibrium is not being established rapidly at the surface of the electrode. 4 The effects of this slow equilibrium behavior are apparent in the flow battery testing.

Figure 17:
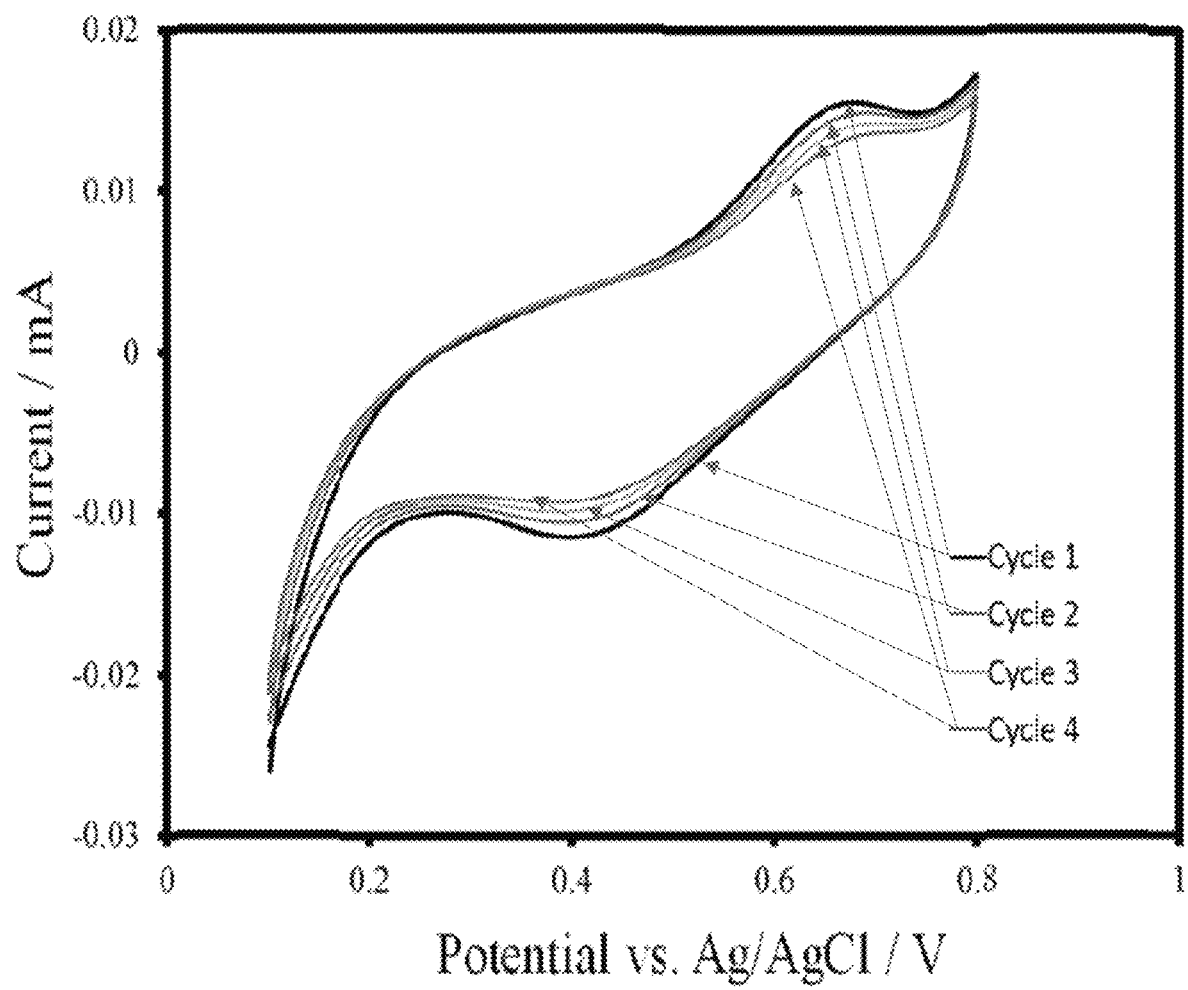
FIG. 17 provides a CV scan of the CleanFlow lignin on a gold foil working electrode without an inert gas purging. The cycle number is indicated on the plot, and the intensity of the redox peaks decreases each cycle.

A trace of the CleanFlow lignin on a gold foil working electrode without an inert gas purged headspace is shown in FIG. 17. This voltammogram was cycled 4 times, and shows clear redox decay over each cycle. The numbers on the chart indicate which peaks correspond to which sweep, and the decay is consistent over each cycle. With inert gas purging on the headspace of the CV cell this behavior disappears and the redox peaks are much more stable. This led to the aforementioned oxygen decay theory, and thus inert gas purging was implemented on all subsequent CV tests, and on the flow battery system.

Initial Cycling and Performance Improvement

The ligninsulfonate flow battery was first setup for operation on cell build number 1 as described in Table 1 above.

This initial build of the battery suffered from high resistance and poor performance, with best polarization resistances of 72.25 and 47.8 ohm cm$^2$ on charge and discharge, respectively. Therefore current densities needed to be kept low, under 5 mA/cm$^2$, in order to keep voltages out of the range of oxygen and hydrogen evolution.

Figure 18:
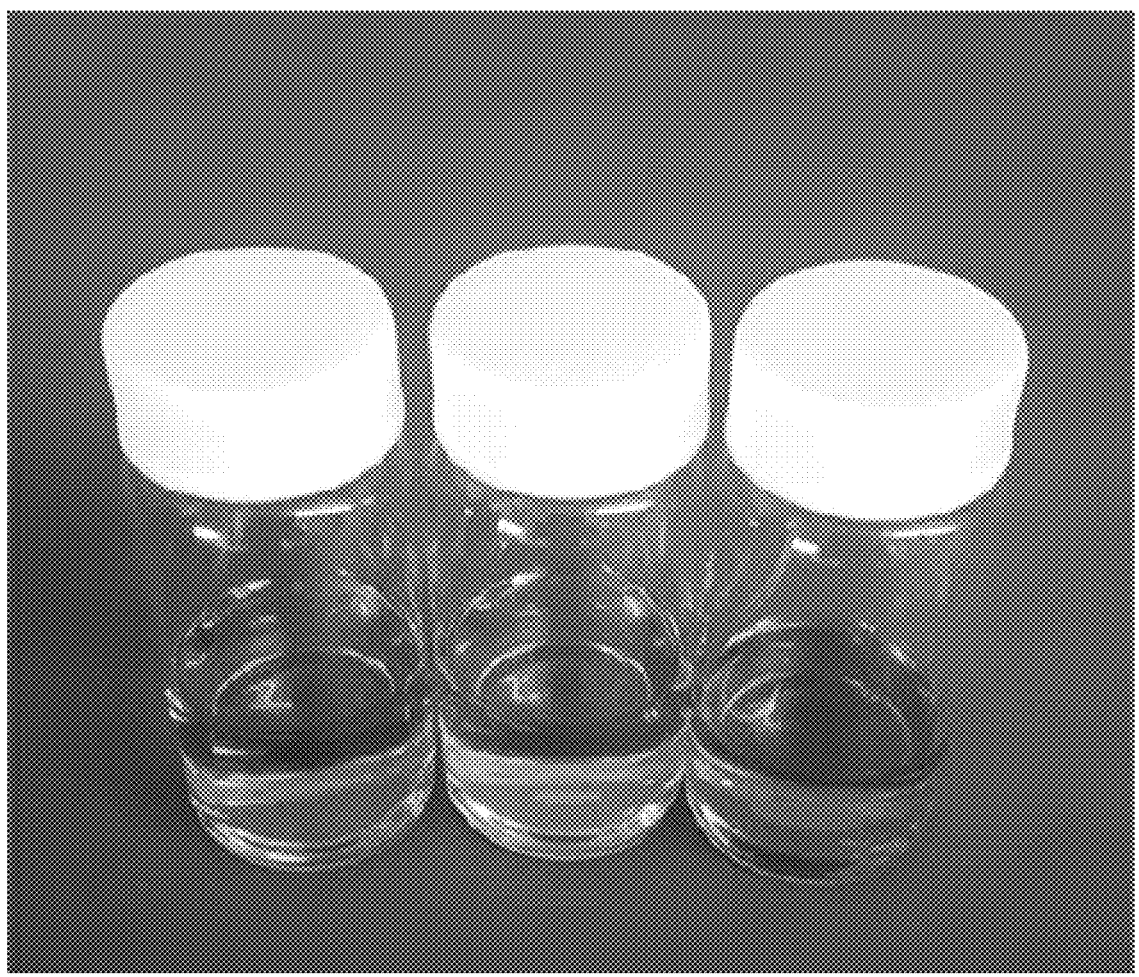
FIG. 18 provides a photograph of three containers containing positive electrolyte at approximately 50% (left), 0% (center), and 100% (right) states of charge.

During these initial tests the setup did show signs of the lignin redox reactions occurring and the system operating as a battery. The OCV decreased as the battery was discharged and increased on charge. As the battery cycled, the color of the positive electrolyte changed from a dark red color to a pale orange and back to dark red at the beginning of the next cycle. This is shown in FIG. 18, and is a result of the positive electrolyte solution containing a high concentration of bromine at top of charge, and using that bromine and protons from the lignin to form hydrobromic acid as it discharges. Unfortunately because of the dark color of the negative electrolyte solution it was not possible to notice an appreciable color change on that material. Because of its oxygen sensitivity it also could not be tested using spectral techniques such as UV-vis.

While the lignin flow battery worked, it did so with less than optimal performance. Accordingly, subsequent efforts aimed at improving battery performance. In order to confirm that the flow battery cells had proper electrical and mechanical contact, dry cell builds were assembled. Dry electrical resistance was measured by assembling the cells without the ion exchange membrane, and measuring the ohmic resistance between the two current collectors. The FS hardware generally had results in the range of 1-2 ohms, depending on the electrodes used and the torque applied on the cell compression hardware. This is relatively high for a dry cell assembly of this size, and it was hypothesized that this high resistance was the result of corrosion on the current collectors, and poor contact in the active area of the cell due to mechanical deformation of the end plates.

Figure 19:
FIG. 19 provides a photograph of pressure paper indicating that the FS hardware exhibited poor loading and uneven distribution.

In order to verify compression uniformity across the cell, mechanical loading studies were done by placing Fujifilm Prescale Extreme Low Pressure (4LW) pressure sensitive paper between the membrane and positive side electrodes, and assembling the battery as usual. After 10 minutes the cells were disassembled and the pressure paper examined. The result of one of these tests is shown below in FIG. 19, and appears to exhibit non uniform compression across the cell and low loading in the cell active area.

Figure 20:
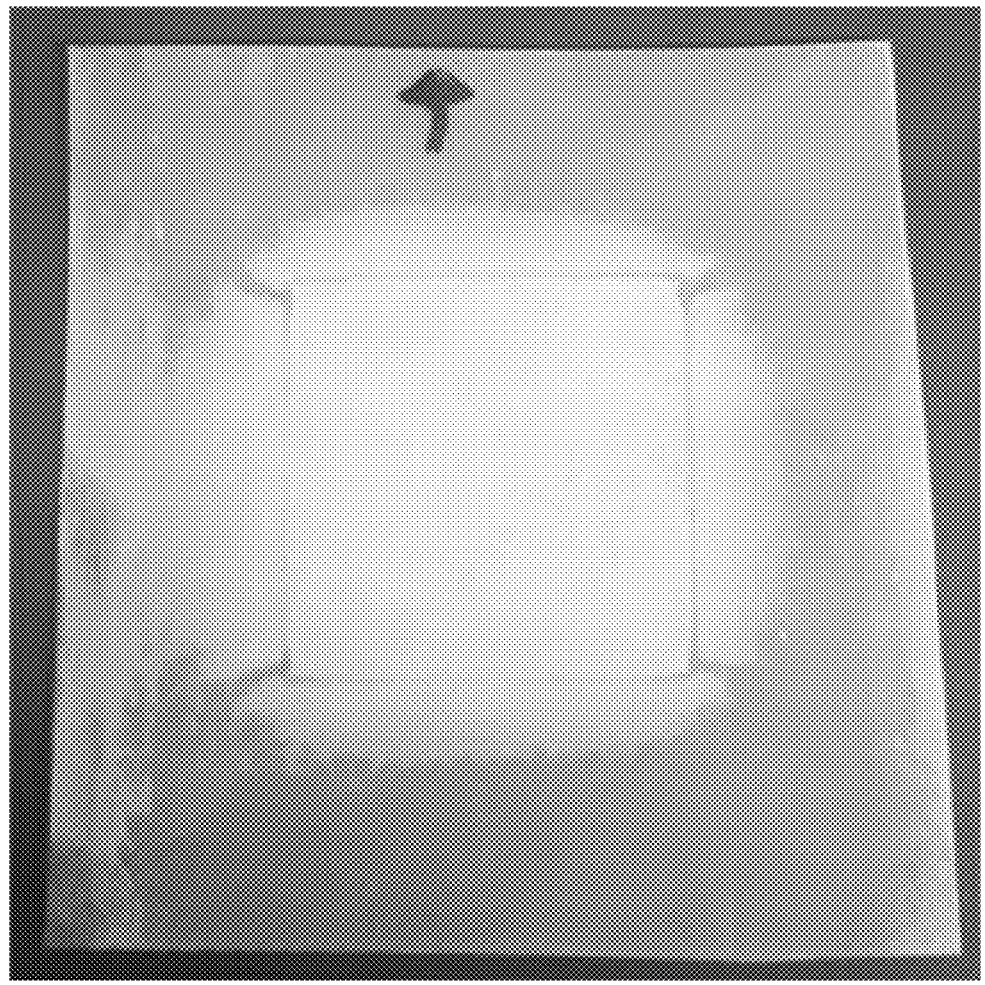
FIG. 20 provides a photograph of pressure paper indicating that the FBH hardware exhibited uniform loading.

Because of these apparent limitations in the FS battery cell hardware, the FBH cell was acquired. This cell features gold plated current collectors to increase electrical conductivity and resist corrosion, as well as machined aluminum endplates to minimize mechanical deformation when compared with the PVC end plates on the FS hardware. Dry cell resistance measurements of this cell had much lower values of approximately 0.2 ohms, and pressure paper tests showed much better uniformity, an example of which is shown in FIG. 20.

Although the pressure paper still indicated relatively low loading in the active area, this had to be optimized against fluidic pressure drop through the cell. Thicker electrodes were inserted into the cell in order to increase compression and decrease contact resistance, and this led to a rise in pressure drop especially in the more viscous negative side of the battery. Thus, in this case lower compression was chosen over excessively high pressure drop.

Figure 21:
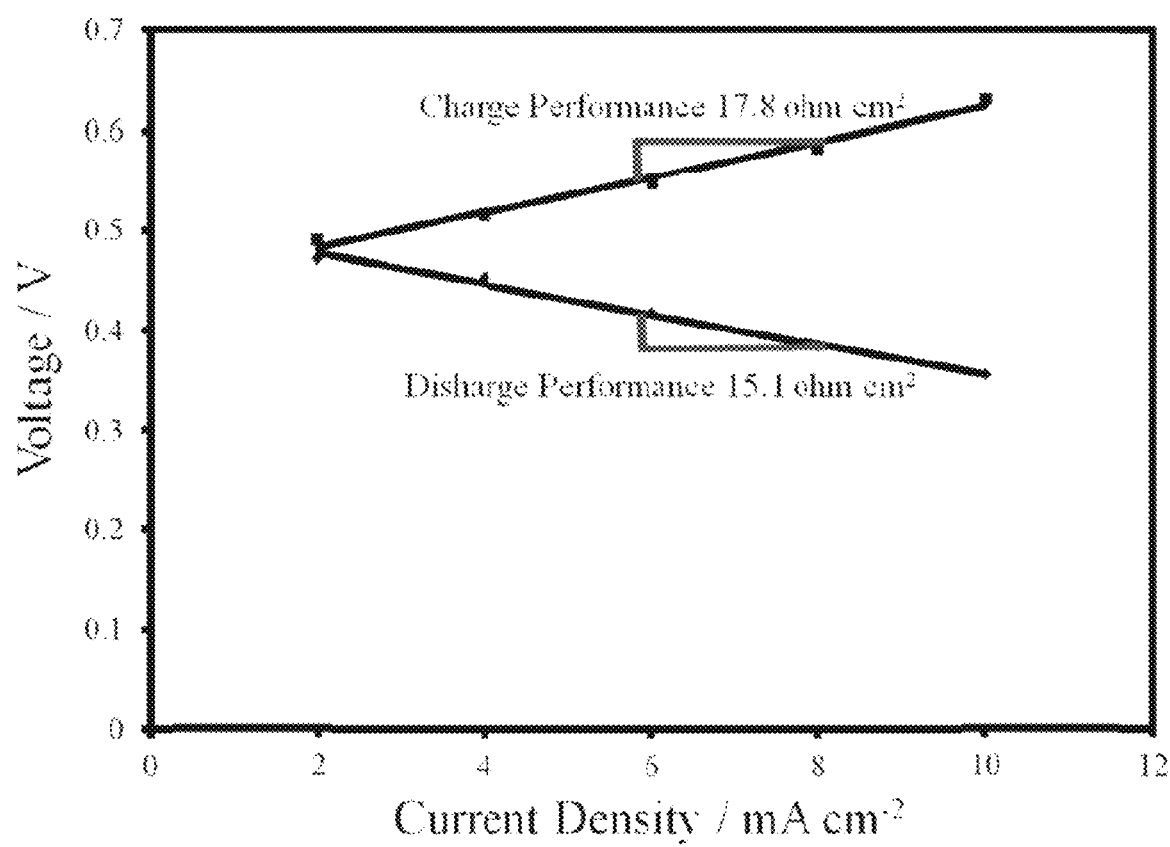
FIG. 21 provides a polarization curve for cell build #8 using CleanFlow lignin electrolyte.

After iterating on various cell and pretreatment configurations (see Table 1 above), a an improved combination of materials and methods was found in build #8. This configuration was built on the FBH platform, with 2 plasma pretreated AvCarb G100 felts on either side, a Nafion 212 membrane pretreated as described earlier, and the 5 cm$^2$ column flow field. This configuration was able to achieve much lower resistances, as low as 14.20 ohm cm$^2$ on charge and 17.75 ohm cm$^2$ on discharge (FIG. 21), with good repeatability. Thus, this configuration was used for the majority of the remaining performance testing.

Cell Performance Data

Figure 22:
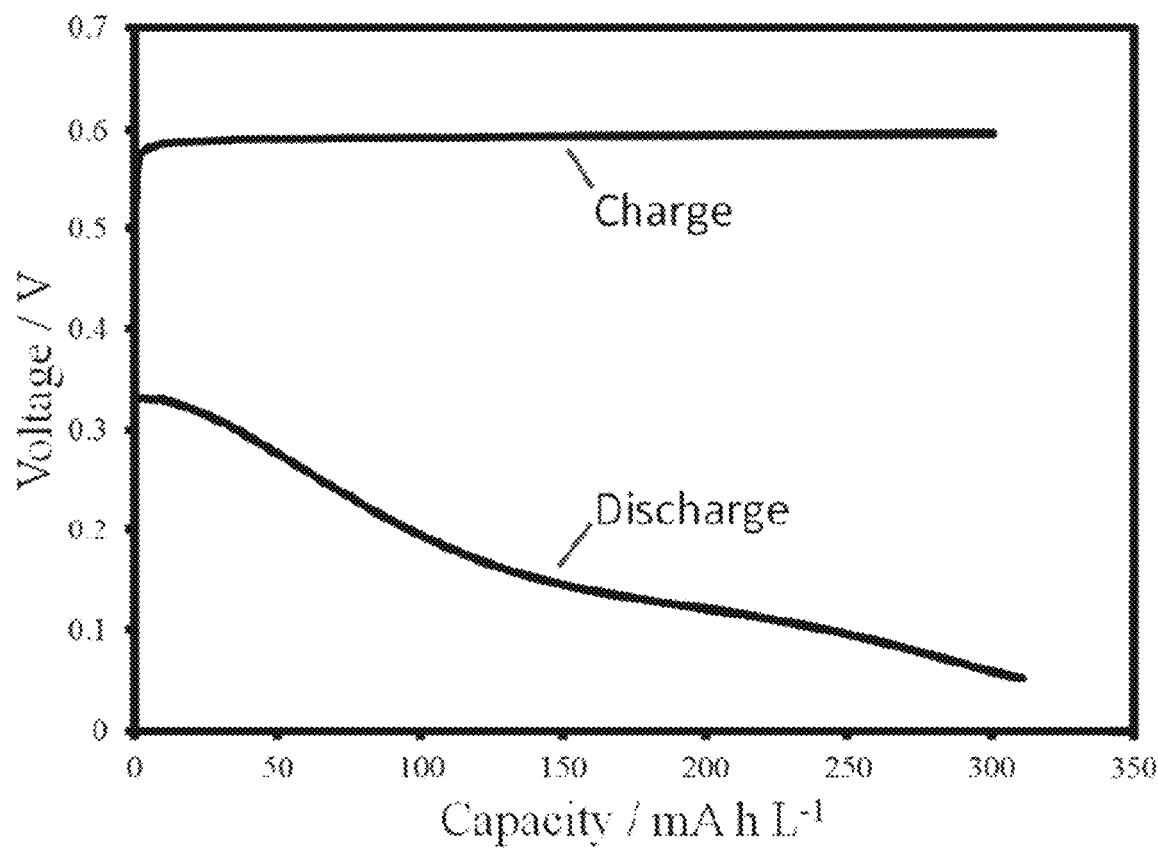
FIG. 22 provides a graph of voltage traces during galvanostatic charge and discharge at 10 mA cm$^{-2}$.

Voltage traces of the best performing lignin battery are shown below in FIG. 22. This trace was taken at a current density of 10 mA cm$^{-2}$ on the CleanFlow ligninsulfonate. The charge curve is limited to the amount of coulombs that were discharged, and because the positive side of the battery was not configured to be capacity limiting, the voltage remains on the plateau throughout the entire charge, and does not increase rapidly prior to being cutoff. More interesting is the discharge curve, which shows a clear plateau at 150 mV, and also shows a more rapid voltage decrease as the lignin runs out of phenol groups that have not yet been oxidized.

Figure 23:
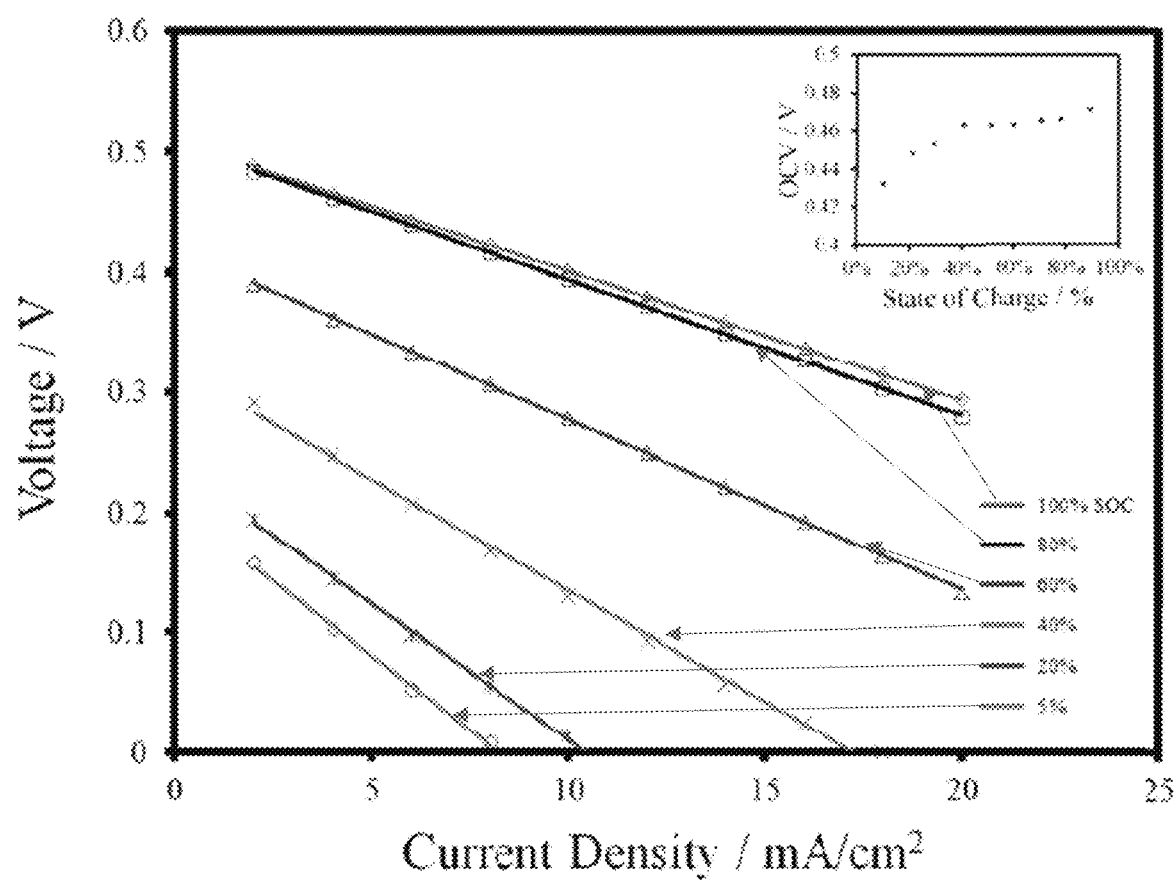
FIG. 23 provides a graph of cell voltage vs current density at various states of charge, and open circuit voltage (OCV) at various states of charge (see inset).

In FIG. 23, cell voltage is plotted against current density at various states of charge. The power density of the battery shows a significant decrease at lower states of charge, specifically below 60%. This confirms that limitations in the reactants mass transport have a significant impact on the cell voltage.[3] The ends of the best fit lines for each SOC diverge as current density increases, as expected with mass transport limitations. The inset shows an increase in OCV, from 0.42 to 0.48 V, with good linearity as the SOC increases.

Voltage traces for galvanostatic charging and discharging at various current densities are shown in FIG. 24A, alongside calculated voltage efficiencies in FIG. 24B. There is no substantial reduction in voltage efficiency between these small current density steps, however efficiency beyond current densities of 10 mA cm$^{-2}$ supports negative mass transport effects at high current densities.[44] The relatively low OCV of the battery system, particularly with the CleanFlow lignin that this data was collected from, is also a contributing factor to the drop on voltage efficiency.

The current densities that the lignin flow battery was able to achieve, despite mass transport limitations, are in line with, if not greater than, some other organic flow battery materials that have been published.[3] Mass transport effects can be mitigated, and current densities further increased, by optimizing electrode material, pretreatment method, and flow field.

Figure 25:
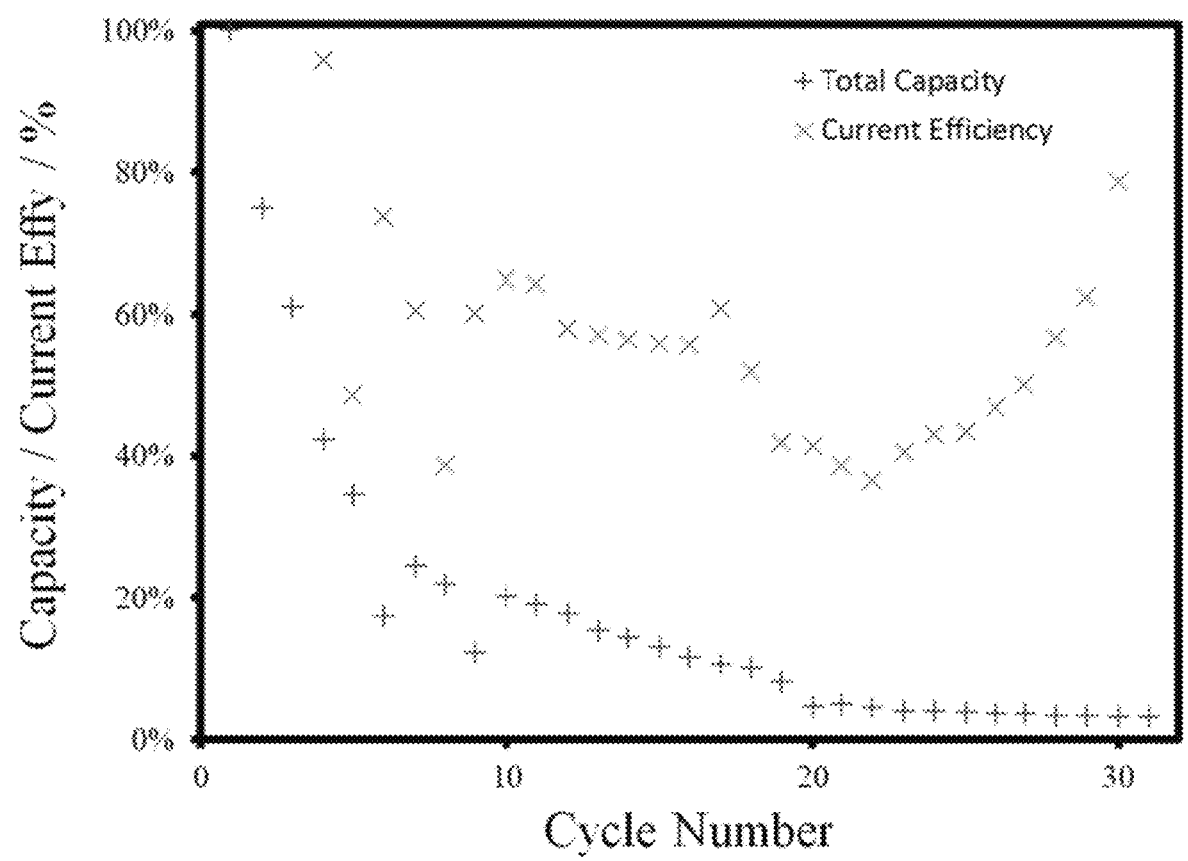
FIG. 25 provides a graph of current efficiency and capacity retention over 30 charge/discharge cycles of a lignin-based flow battery.

Durability data for the ligninsulfonate battery used here is shown in FIG. 25.

The initial lignin flow battery prototypes were able to store energy successfully. A series of tests were run on the flow battery system, and modifications were made to the battery hardware and electrolytes to increase the overall performance of the ligninsulfonate battery. The battery was able to reach current densities of up to 20 mA cm$^{-2}$, and polarization resistance as low as 14.20 ohm cm$^2$. It also achieved voltage efficiencies as high as 85%.

REFERENCES

1. Soloveichik, G. L., Flow Batteries: Current Status and Trends. Chemical reviews 2015, 115 (20), 11533.
2. Jens, N.; Lars, W.; Nataliya, R.; Karsten, P.; Jens, T., Techno-Economic Modeling and Analysis ofRedox Flow Battery Systems. Energies 2016, 9 (8), 627.
3. Yang, B.; Hoober-Burkhardt, L.; Wang, F.; Surya Prakash, G. K.; Narayanan, S. R., An Inexpensive Aqueous Flow Battery for Large-Scale Electrical Energy Storage Based on Water-Soluble Organic Redox Couples. Journal of the Electrochemical Society 2014, 161 (9), A1371-A1380.
4. Huskinson, B. T.; Marshak, M.; Suh, C.; Er, S.; Gerhardt, M.; Galvin, C. J.; Chen, X.; Aspuru-Guzik, A.; Gordon, R. G.; Aziz, M. J., A metal-free organic-inorganic aqueous flow battery. Nature 505, 195-198 (2014).
5. Wu, M. C.; Zhao, T. S.; Jiang, H. R.; Zeng, Y. K.; Ren, Y. X., High-performance zinc bromine flow battery via improved design of electrolyte and electrode. Journal of Power Sources 2017, 355, 62-68.
6. Miroshnikov, M.; Divya, K. P.; Babu, G.; Meiyazhagan, A.; Reddy Arava, L. M.; Ajayan, P. M.; John, G., Power from nature: designing green battery materials from electroactive quinone derivatives and organic polymers. Journal of Materials Chemistry A 2016, 4 (32), 12370-12386.
7. Milczarek, G.; Inganas, 0., Renewable cathode materials from biopolymer/conjugated polymer interpenetrating networks. Science (New York, N Y) 2012, 335 (6075), 1468.
8. Montague, L., Lignin process design confirmation and capital cost evaluation. Report 42002/02, Review of design. In Review of design, National Renewable Energy, L., Ed. Golden, Colo.: National Renewable Energy Laboratory: Golden, Colo., 2003.
9. Hakeem, K. R.; Jawaid, M.; Alothman, 0. Y., Agricultural biomass based potential materials. Cham: Springer: 2015.
10. Al-Lagtah, N. M. A.; Al-Muhtaseb, A.; amp; Amp; Apos; a, H.; Ahmad, M. N. M.; Salameh, Y., Chemical and physical characteristics of optimal synthesised activated carbons from grass-derived sulfonated lignin versus commercial activated carbons. Microporous and Mesoporous Materials 2016, 225, 504-514.
11. Matsushita, Y.; Yasuda, S., Preparation and evaluation of lignosulfonates as a dispersant for gypsum paste from acid hydrolysis lignin. Bioresource Technology 2005, 96 (4), 465-470.
12. Kear, G.; Shah, A. A.; Walsh, F. C., Development of the all-vanadium redox flow battery for energy storage: a review of technological, financial and policy aspects. International Journal of Energy Research 2012, 36 (11), 1105-1120.
13. Zeng, Y. K.; Zhao, T. S.; Zhou, X. L.; Wei, L.; Ren, Y. X., A novel iron-lead redox flow battery for large-scale energy storage. Journal of Power Sources 2017, 346, 97-102.
14. Manohar, A. K.; Kim, K. M.; Plichta, E.; Hendrickson, M.; Rawlings, S.; Narayanan, S. R., A High Efficiency Iron-Chloride Redox Flow Battery for Large-Scale Energy Storage. Journal of The Electrochemical Society 2016, 163 (1), A5118-A5125.
15. Zaman, A. A.; Fricke, A. L., Effect of pulping conditions and black liquor composition on Newtonian viscosity of high solids kraft black liquors. Industrial and Engineering Chemistry Research 1996, 35 (2), 590-597.
16. Toledano, A.; Garcia, A.; Mondragon, I.; Labidi, J., Lignin separation and fractionation by ultrafiltration. Separation and Purification Technology 2010, 71 (1), 38-43.
17. Arkell, A.; Olsson, J.; Wallberg, 0., Process performance in lignin separation from softwood black liquor by membrane filtration. Chemical Engineering Research and Design 2014, 92 (9), 1792-1800.
18. Banoub, J. H.; Benjelloun-Mlayah, B.; Ziarelli, F.; Joly, N.; Delmas, M., Elucidation of the complex molecular structure of wheat straw lignin polymer by atmospheric pressure photoionization quadrupole time-of-flight tandem mass spectrometry. Rapid communications in mass spectrometry: RCM2007, 21 (17), 2867.
19. Higuchi, T., Biosynthesis of Lignin. Biosynthesis and Biodegradation of Wood Components. 1985, 141.
20. Al-Fetlawi, H.; Shah, A. A.; Walsh, F. C., Modelling the effects of oxygen evolution in the all-vanadium redox flow battery. Electrochimica Acta 2010, 55 (9), 3192-3205.
21. Pavelka, M.; Wandschneider, F.; Mazur, P., Thermodynamic derivation of open circuit voltage in vanadium redox flow batteries. Journal of Power Sources 2015, 293, 400-408.
22. Rengui, L.; Aochi, Y.; Yufeng, X.; Lichao, X.; Chunbo, Z., Analysis of the key factors affecting the energy efficiency of batteries in electric vehicle World Electric Vehicle Journal: Shenzhen, China, 2010; Vol. 4, pp 9-13.
23. Chen, Q.; Eisenach, L.; Aziz, M., Cycling Analysis of a Quinone-Bromide Redox Flow Battery. J. Electrochem. Soc. 2016, 163 (1), A5057-A5063.
24. Chen, D.; Li, D.; Li, X., Hierarchical porous poly (ether sulfone) membranes with excellent capacity retention for vanadium flow battery application. Journal of Power Sources 2017, 353, 11-18.
25. Yuan, Z.; Li, X.; Duan, Y.; Zhao, Y.; Zhang, H. M., Application and degradation mechanism of polyoxadiazole based membrane for vanadium flow batteries. J. Membr. Sci. 2015, 488, 194-202.
26. Knehr, K.; Agar, E.; Dennison, C. R.; Kalidindi, A.; Kumbur, E. C., A Transient Vanadium Flow Battery Model Incorporating Vanadium Crossover and Water Transport through the Membrane. J. Electrochem. Soc. 2012, 159 (9), A1446-A1459.
27. Tseng, Y.-C., DESIGN, CONSTRUCTION, AND STUDY OF PERFORMANCE IMPROVEMENT IN A VANADIUM REDOX FLOW BATTERY The Pennsylvania State University: 2011.
28. Latz, A.; Zausch, J., Thermodynamic derivation of a Butler-Volmer model for intercalation in Li-ion batteries. Electrochimica Acta 2013, 110, 358-362.
29. Lisboa, K. M.; Marschewski, J.; Ebejer, N.; Ruch, P.; Cotta, R. M.; Michel, B.; Poulikakos, D., Mass transport enhancement in redox flow batteries with corrugated fluidic networks. Journal of Power Sources 2017, 359, 322-331.
30. Qian, P.; Zhang, H.; Chen, J.; Wen, Y.; Luo, Q.; Liu, Z.; You, D.; Yi, B., A novel electrode-bipolar plate assembly for vanadium redox flow battery applications. Journal of Power Sources 2008, 175 (1), 613-620.
31. Parasuraman, A.; Lim, T. M.; Menictas, C.; Skyllas-Kazacos, M., Review of material research and development for vanadium redox flow battery applications. (Report). Electrochimica Acta 2013, 101, 27.
32. Huggins, R., Energy storage fundamentals, materials and applications. 2nd ed. ed.; Cham: Springer: 2016.
33. Sankaranarayanan, A.; Chandalia, S. B., Process development of the synthesis of 3,4,5-trimethoxytoluene. Org. Process Res. Dev. 2006, 10 (3), 487-492.
34. Bourke, A.; Miller, M. A.; Lynch, R. P.; Gao, X.; Landon, J.; Wainright, J. S.; Savinell, R. F.; Buckley, D. N., Electrode Kinetics of Vanadium Flow Batteries: Contrasting Responses of V II-V III and V IV-V V to Electrochemical Pretreatment of Carbon. Journal of The Electrochemical Society 2016, 163 (1), A5097-A5105.
35. Zhang, Z.; Xi, J.; Zhou, H.; Qiu, X., KOH etched graphite felt with improved wettability and activity for vanadium flow batteries. Electrochimica Acta 2016, 218, 15-23.

36. Jiang, B.; Yu, L.; Wu, L.; Mu, D.; Liu, L.; Xi, J.; Qiu, X., Insights into the Impact of the Nafion Membrane Pretreatment Process on Vanadium Flow Battery Performance. ACS applied materials & amp; amp; interfaces 2016, 8 (19), 12228.
37. Yin, C.; Guo, S.; Fang, H.; Liu, J.; Li, Y.; Tang, H., Numerical and experimental studies of stack shunt current for vanadium redox flow battery. Applied Energy 2015, 151, 237-248.
38. Areskogh, D.; Li, J.; Gellerstedt, G.; Henriksson, G., Structural modification of commercial lignosulphonates through laccase catalysis and ozonolysis. Industrial Crops & Products 2010, 32 (3), 458-466. 39. Argyropoulos, D. S., Quantitative Phosphorus-31 NMR Analysis of Lignins, a New Tool for the Lignin Chemist. Journal of Wood Chemistry and Technology 1994, 14 (1), 45-63.
40. Fang, Z.; Smith, R. L., Production of biofuels and chemicals from lignin. Singapore: Springer: Singapore, 2016.
41. Tolbert, A.; Akinosho, H.; Khunsupat, R.; Naskar, A. K.; Ragauskas, A. J., Characterization and analysis of the molecular weight of lignin for biorefining studies. Chichester, UK, 2014; Vol. 8, pp 836-856.
42. Evstigneev, E., Factors affecting lignin solubility. Russian Journal of Applied Chemistry 2011, 84 (6), 1040-1045.
43. Singh, N.; McFarland, E. W., Levelized cost of energy and sensitivity analysis for the hydrogen-bromine flow battery. Journal of Power Sources 2015, 288, 187-198.
44. Na, Z.; Xu, S.; Yin, D.; Wang, L., A cerium-lead redox flow battery system employing supporting electrolyte of methanesulfonic acid. Journal of Power Sources 2015, 295, 28-32.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A flow battery comprising:
a) a first tank comprising a first solvent, the first solvent comprising a positive electrolyte dissolved therein;
b) a second tank comprising a second solvent, the second solvent comprising a negative electrolyte dissolved therein, wherein the negative electrolyte comprises lignin or ligninsulfonate;
c) a battery cell having a first electrode in a first compartment, a second electrode in a second compartment, and an ion conducting membrane that separates the first and second compartments; and
d) one or more pumps configured to pump the first solvent to the first compartment of the battery cell and to pump the second solvent to the second compartment of the battery cell.

2. The flow battery of claim 1, wherein the first or second solvent is water.

3. The flow battery of claim 2, wherein the water is deionized water.

4. The flow battery of claim 1, wherein the second solvent further comprises a base.

5. The flow battery of claim 4, wherein the base is sodium hydroxide.

6. The flow battery of claim 1, wherein the second solvent further comprises an acid.

7. The flow battery of claim 6, wherein the acid is perchloric acid or acetic acid.

8. The flow battery of claim 1, wherein the lignin or ligninsulfonate of the second solvent is at a concentration of about 250 to about 1000 g per liter.

9. The flow battery of claim 8, wherein the second solvent comprises acid at a concentration of 0.05 M to 0.2 M.

10. The flow battery of claim 9, wherein the second solvent has a pH from about 1 to about 5.

11. The flow battery of claim 1, wherein the lignin or ligninsulfonate of the second solvent is ultrafiltered lignin or ultrafiltered ligninsulfonate.

12. The flow battery of claim 1, wherein the second solvent has a dynamic viscosity of about 1 cP to about 100 cP.

13. The flow battery of claim 1, wherein the lignin or ligninsulfonate has an average molecular weight of about 1,500 g/mol to about 5,000 g/mol.

14. The flow battery of claim 13, wherein the lignin or ligninsulfonate has an average phenol group concentration of about 0.5 mmol $g^{-1}$ to 2.0 mmol $g^{-1}$.

15. The flow battery of claim 14, wherein the lignin or ligninsulfonate has an average phenol group concentration of about 1.11 mmol $g^{-1}$ and an average molecular weight of about 4,000 g/mol.

16. The flow battery of claim 1, wherein the second solvent does not include a metal catalyst.

17. The flow battery of claim 1, wherein the flow battery is adapted to discharge by electrochemically reacting phenolic hydroxyl groups of the lignin or ligninsulfonate, to keto groups, and adapted to charge by electrochemically reacting the keto groups to phenolic hydroxyl groups of the lignin or ligninsulfonate.

18. The flow battery of claim 1, wherein the negative electrolyte comprises ligninsulfonate.

* * * * *